United States Patent [19]

Moutot

[11] Patent Number: 4,669,574
[45] Date of Patent: Jun. 2, 1987

[54] FOLDABLE STAIRCASES FOR VEHICLES

[76] Inventor: Pascal Moutot, St Loup Cammas, 31140 Aucamville, France

[21] Appl. No.: 832,088

[22] Filed: Feb. 24, 1986

[30] Foreign Application Priority Data

Feb. 25, 1985 [FR] France ................. 85 02787

[51] Int. Cl.⁴ .................................. B64C 1/24
[52] U.S. Cl. ........................ 182/88; 182/106; 182/163; 244/129.6
[58] Field of Search ............... 182/88, 95, 106, 77, 182/78, 79, 91, 163, 36; 244/129.6, 137 P

[56] References Cited

U.S. PATENT DOCUMENTS

| 2,779,525 | 1/1957 | Vogel | 182/88 |
| 2,863,594 | 12/1958 | Shafer | 182/88 |
| 2,990,148 | 6/1961 | James | 182/88 |
| 3,047,093 | 7/1962 | Cruz | 182/106 |
| 3,083,784 | 4/1963 | Urian | 182/106 |
| 3,403,749 | 10/1968 | Warren | 182/106 |
| 3,941,337 | 3/1976 | Molter | 244/129.6 |
| 4,014,486 | 3/1977 | Nelson | 244/129.6 |
| 4,039,163 | 8/1977 | Shorey | 244/129.6 |

FOREIGN PATENT DOCUMENTS 548915 11/1959 Belgium .
2164540 7/1973 Fed. Rep. of Germany .
2217211 9/1974 France .

Primary Examiner—Reinaldo P. Machado
Attorney, Agent, or Firm—Young & Thompson

[57] ABSTRACT

The present invention has as an object a foldable staircase for vehicles, for examples in airplane, which, once folded, is housed in a compartment provided in the fuselage.

This staircase comprises:
a carriage (4) slidably mounted in the compartment (1) which carriage receives, in an overhanging manner, a foldable staircase structure (5) which, when it is housed in the compartment, is folded and extends toward the opening (3) of this latter,
a motor mechanism (6) either for driving the carriage (4) toward the opening (3) and extracting the structure from the compartment (1) outside of which it will be deployed, or for restoring the structure into the compartment after this latter has been folded and conducted at the time of folding into the axis of the compartment,
and motor means (7) for unfolding or re-folding, along a vertical plane, the structure (5) when this latter is outside of the compartment (1).

35 Claims, 29 Drawing Figures

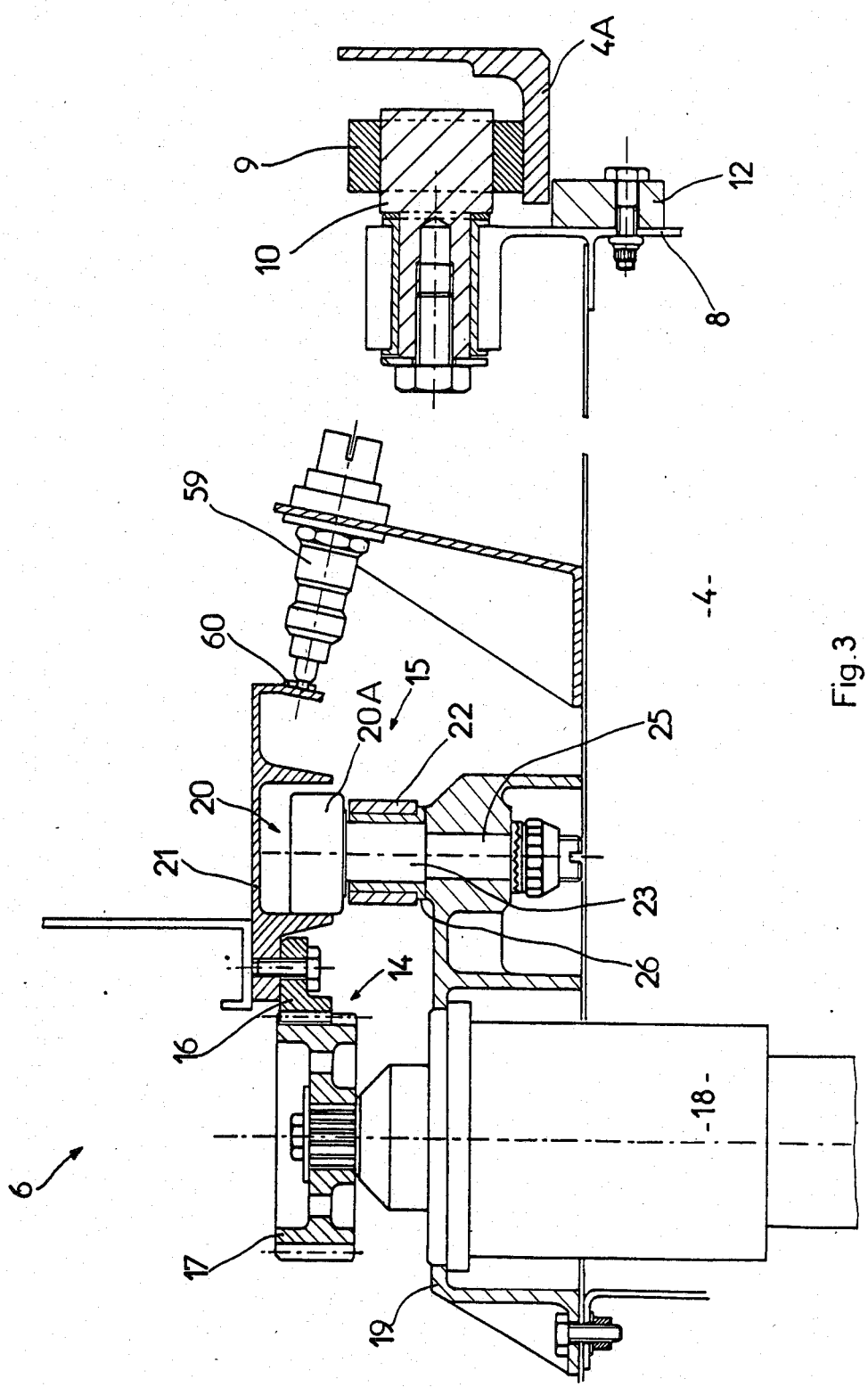

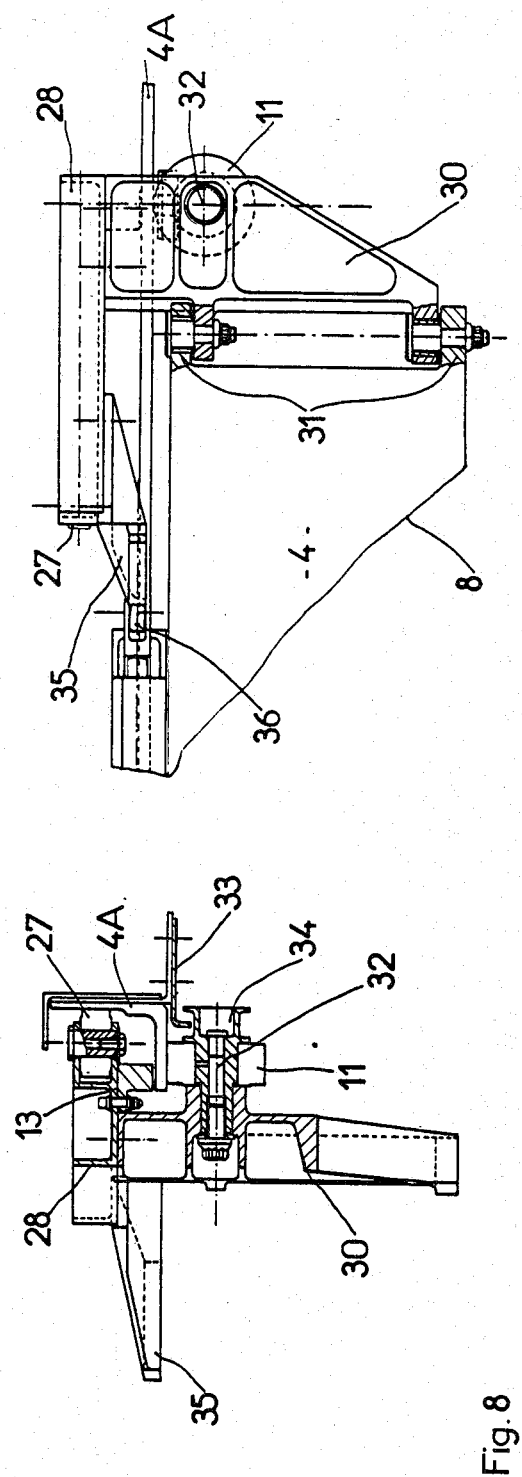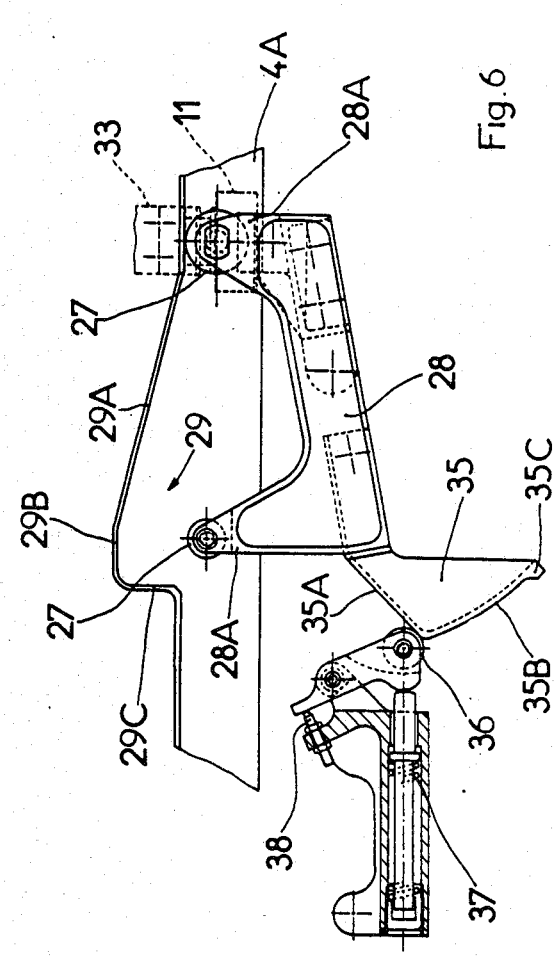

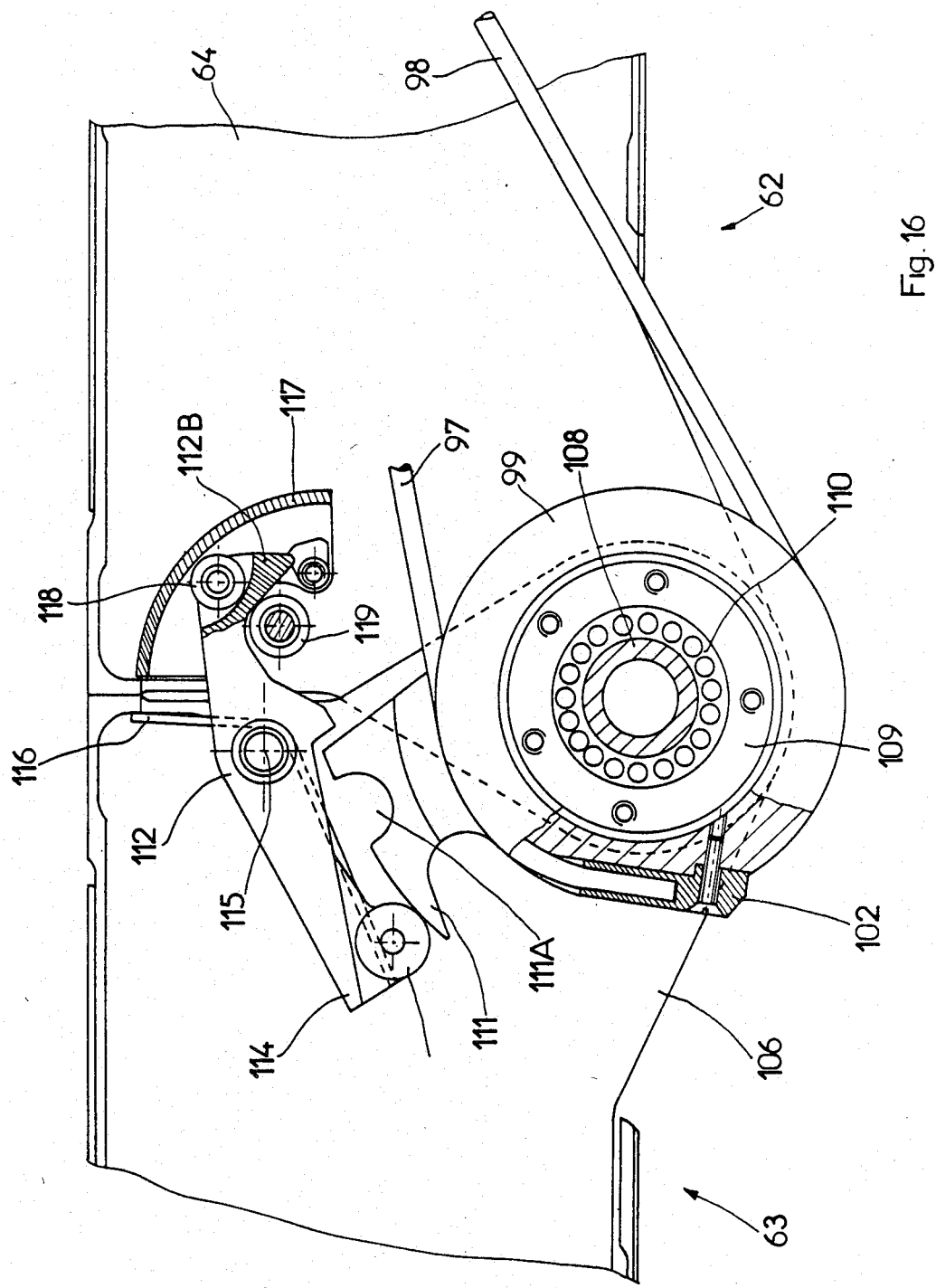

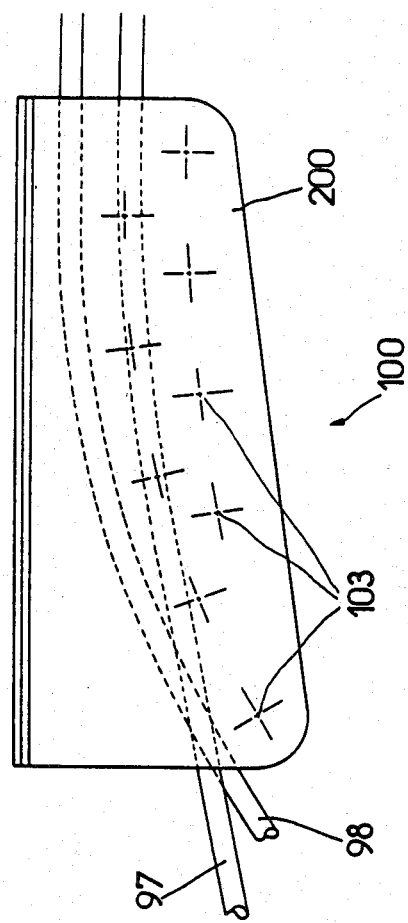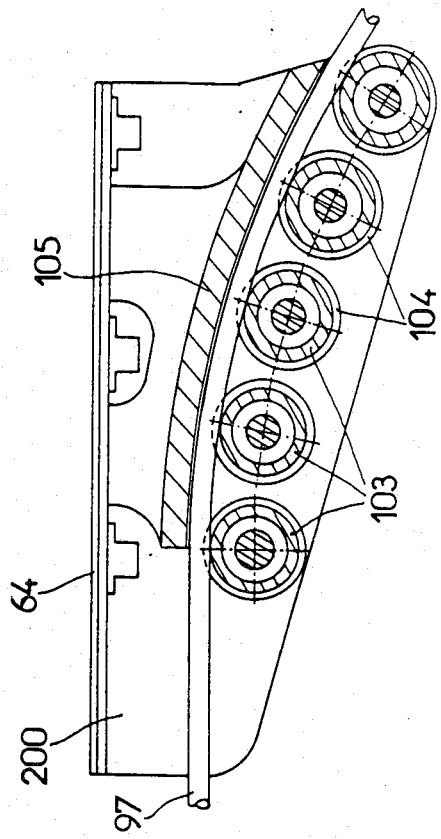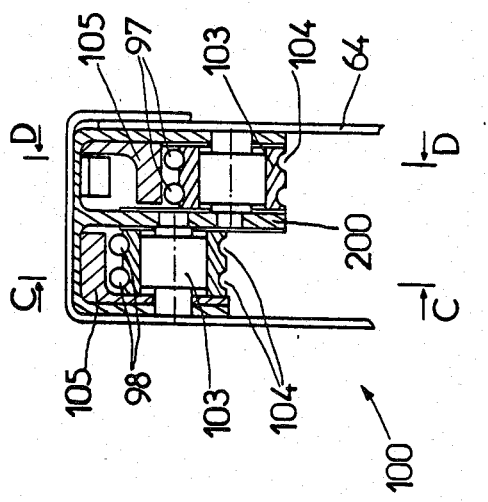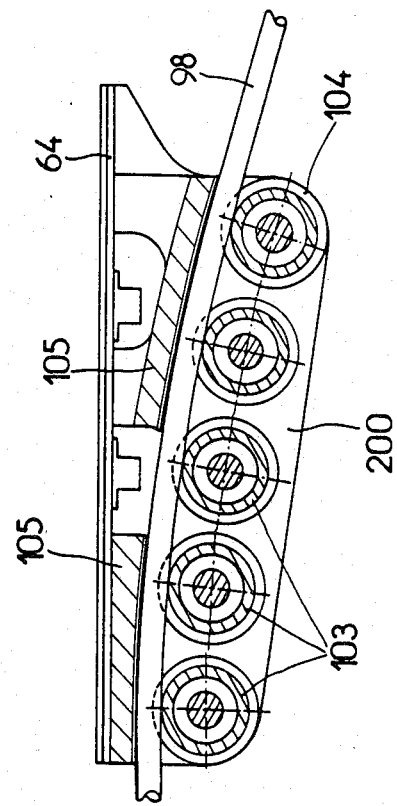
Fig. 26
Fig. 25
Fig. 23
Fig. 24

FOLDABLE STAIRCASES FOR VEHICLES

The present invention has as an object a foldable staircase for vehicles.

It is known that certain airports are not able to provide embarking and disembarking means adapted to each type of apparatus.

For this reason, it has been desirable to equip each apparatus with its appropriate means for embarking passemgers. It is necessary that these means be foldable so as to be able to be introduced into the apparatus and that they occupy as little space as possible on board.

Moreover, it is necessary that these means be of a simple and sturdy construction so as to reduce their cost of maintenance.

It is similarly desirable that these means may be maneuvered in an automatic manner. On the other hand these embarking means must offer a sufficient flexibility in their connection with the vehicle so as to be able to accept the movements of the one with respect to the other.

To attain these different objects, the applicant has provided a foldable staircase which, once folded, is introduced into a horizontal compartment provided in the fuselage of the apparatus and which, once unfolded, is extended in an inclined manner toward the ground beneath the access door to the fuselage.

To this end, the staircase according to the invention, for vehicles, for example aircraft, capable of being folded and introduced into a horizontal compartment provided in the fuselage, which horizontal compartment comprises an opening disposed beneath the access door to the aircraft, is characterized essentially in that it comprises:

a carriage slidably mounted in the compartment, which carriage receives in overhanging relationship a foldable staicase structure which, when it is housed in the compartment, is folded and extends toward the opening of this latter, a motor mechanism for either pushing the carriage toward the opening and extracting the structure from the compartment outside of which it will be deployed, or putting the structure back into the compartment after this latter has been folded and brought at the time of the folding into axis of the compartment, and motor means for unfolding or re-folding, according to a vertical plane, the structure when this latter is outside of the compartment.

According to another characteristic, the staircase comprises means permitting a relative lateral tilting between the longitudinal axis of the staircase and the longitudinal axis of the vehicle and means for restoring the said longitudinal axis of the staircase parallel to the axis of the compartment at the time of the re-entry of the staircase into the said compartment.

According to yet another characteristic according to the invention, the staircase is provided with at least one slidable immobilization means for the carriage in the compartment, in return position.

Other advantages and characteristics will appear from a reading of the description of a preferred embodiment illustrated in the accompanying drawings given by way of a by no means example, in which:

FIGS. 3, 4 and 5 are views respectively from the front, from above, and from the side of the motor mechanism for the carriage of the staircase;

FIGS. 6, 7 and 8 are views from above, from the side and from the rear of the apparatus for rear lateral guiding and restoring of the carriage into the compartment according to an improvement according to the invention;

FIG. 16 is a side view of the articulation between sections according to the invention in deployed position;

FIG. 23 is a transverse sectional view showing the rolling sleeves for the drive cables in the beam of the upper section;

FIGS. 24 and 25 are sectional views along the lines C—C and D—D of FIG. 23 respectively;

FIG. 26 is a side view of another rolling sleeve for the said cables;

Figure 1:
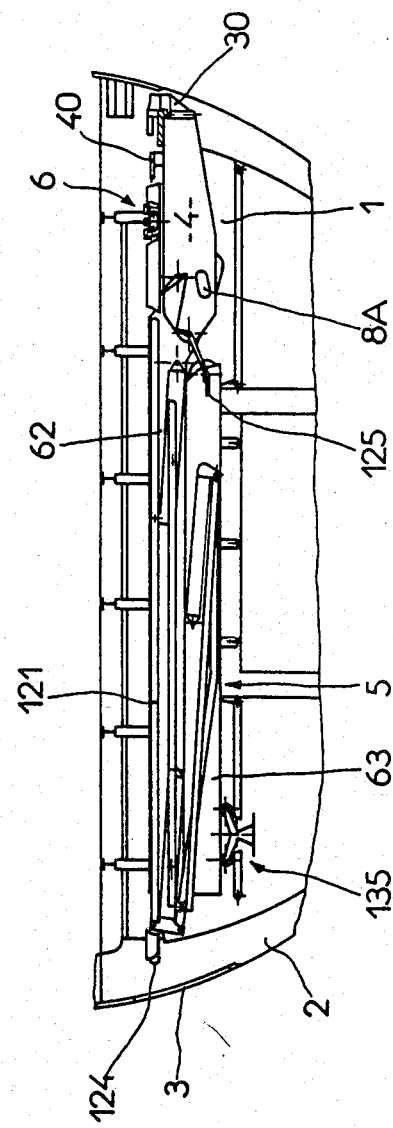
FIG. 1 is a side view of the staircase provided with improvements according to the invention, in inserted position.

As is shown in FIG. 1 the staircase according to the invention is disposed in return position in a compartment 1 provided transverse to the longitudinal axis of the fuselage 2 of the vehicle.

The compartment 1 is provided with an opening 3 passing out beneath the access door of the vehicle. Through this opening 3 the staircase is introduced to or extracted from the compartment 1.

The staircase comprises a carriage 4 slidably mounted on rails 4A in the compartment 1. This carriage 4 receives in overhanging relationship a foldable staircase structure 5 which, when it is housed in the compartment 1, is folded and extends toward the opening 2 of this latter.

The staircase is similarly provided with a motor mechanism 6 for either pushing the carriage toward the opening 3 and extracting the structure from the compartment 1 outside of which it will be unfolded, or returning the structure into the compartment after it has been folded and restored at the time of folding into the extension of the axis of the compartment.

On the other hand the staircase comprises motor means 7 for folding and unfolding with respect to a vertical plane the structure 5 when this latter is outside of the compartment 1.

The carriage 4 is constituted by two parallel side flanks 8, preferably cross braced, and is slidably mounted in the compartment 1 on rails 4A.

To this end, the rails 4A are fixed parallel to one another on the upper part of the compartment and over almost all of the length of this latter. These rails 4A are preferably formed from angle iron and are fixed such that the horizontal flanges are turned toward each other and the vertical flanges are above the horizontal flanges.

The horizontal flanges of the rails 4A constitute the rolling path for the wheels 9 carried by the hubs 10 articulated along a horizontal axis to the flanks 8 of the carriage 4 (FIG. 3).

Preferably, on each flank 8 of the said carriage is mounted a hub 10. The articulation axes of the hubs 10 are disposed in the same transverse plane to the longitudinal axis of the carriage. The said carriage is thus suspended from the rails 4A.

At the back of the carriage 4 and on each side of this latter is mounted a roller 11 bearing against the rail 4A, as shown in FIG. 8.

The rollers 11 permit giving to the carriage a stable position in a horizontal plane with respect to the articulation axis of the hubs 10, while assuring the locking of the said carriage in combination with the cantilever created by the foldable structure 5 of the staircase mounted at the front of the carriage 4.

Advantageously, so as to avoid in case of turbulence too great a jump of the wheels 9, on the rails 4A or of the rollers 11 on these said rails, it is foreseen to fix onto the carriage 4, on the one hand a stop 12 opposite the articulation axis of the hub 10 coming to be disposed beneath the rail 5 (FIG. 3) and on the other hand a stop 13 opposite the axis of the roller 11 coming to be disposed on the rail 4A (FIG. 8).

Preferably the play between the stops 12 and 13 and the face of the rail 5 opposite which they are disposed is adjustable. To this end, according to an embodiment, the stop 12 is eccentric and the stop 13 receives chocks in its mounting on the carriage. These stops are preferably nylon or any other material offering a low coefficient of friction.

According to a preferred embodiment of the staircase according to the invention the motor means 6 actuating the sliding of the carriage 4 in the compartment 1 and on the rails 4A of this latter are constituted by a rack and pinion assembly 14 and by a device 15 for adjusting the play of the rack and pinion assembly 14 and for guiding the carriage 4.

Preferably the rack 16 of the rack and pinion assembly 14 is fixed on the upper part of the compartment 1 parallel to the side rails 4A and between these latter and the pinion 17 is fixed at its end to the output shaft of an electric motor 18 equipped with a moto-reducer fixed on the carriage 4. Preferably the motor 18 is mounted with its shaft vertical in a support 19 fixed to the carriage 4. The teeth of the rack are thus disposed in the vertical direction.

The electric motor is of the type of those having two directions of rotation so that the carriage and the structure may be driven in translation in one direction or the other.

The apparatus 15 for adjusting the play of the rack and pinion assembly is, according to an embodiment, constituted by a set of friction rollers 20 fixed to the carriage 4 and by a slide 21 fixed parallel to the rack 16 and on the upper part of the compartment 1, which slide is adapted to receive the set of friction rollers 20.

Figure 5:
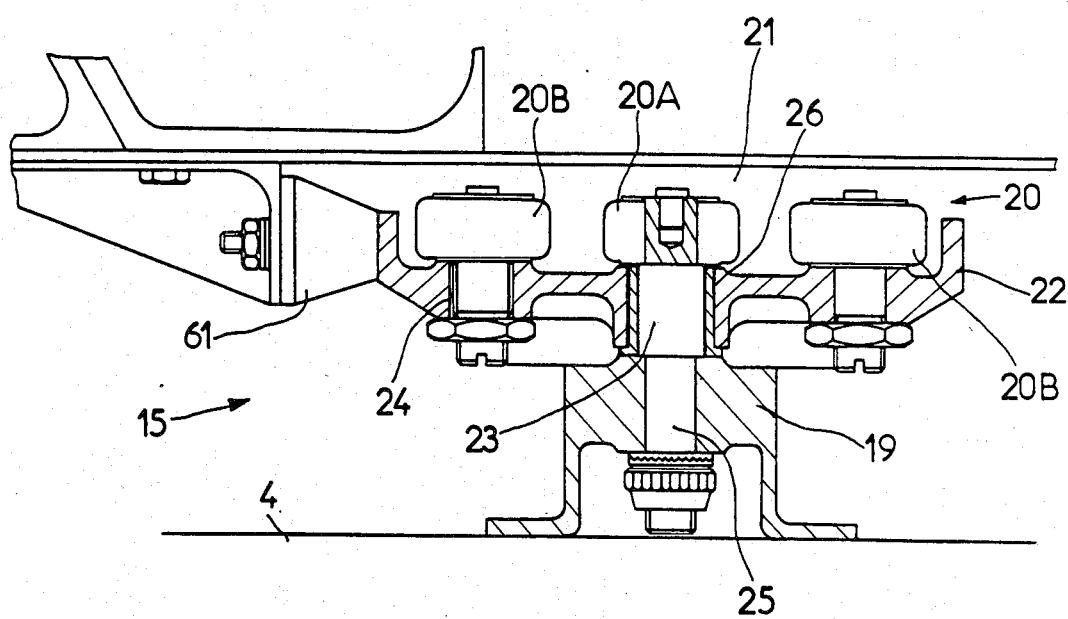
Figure 4:
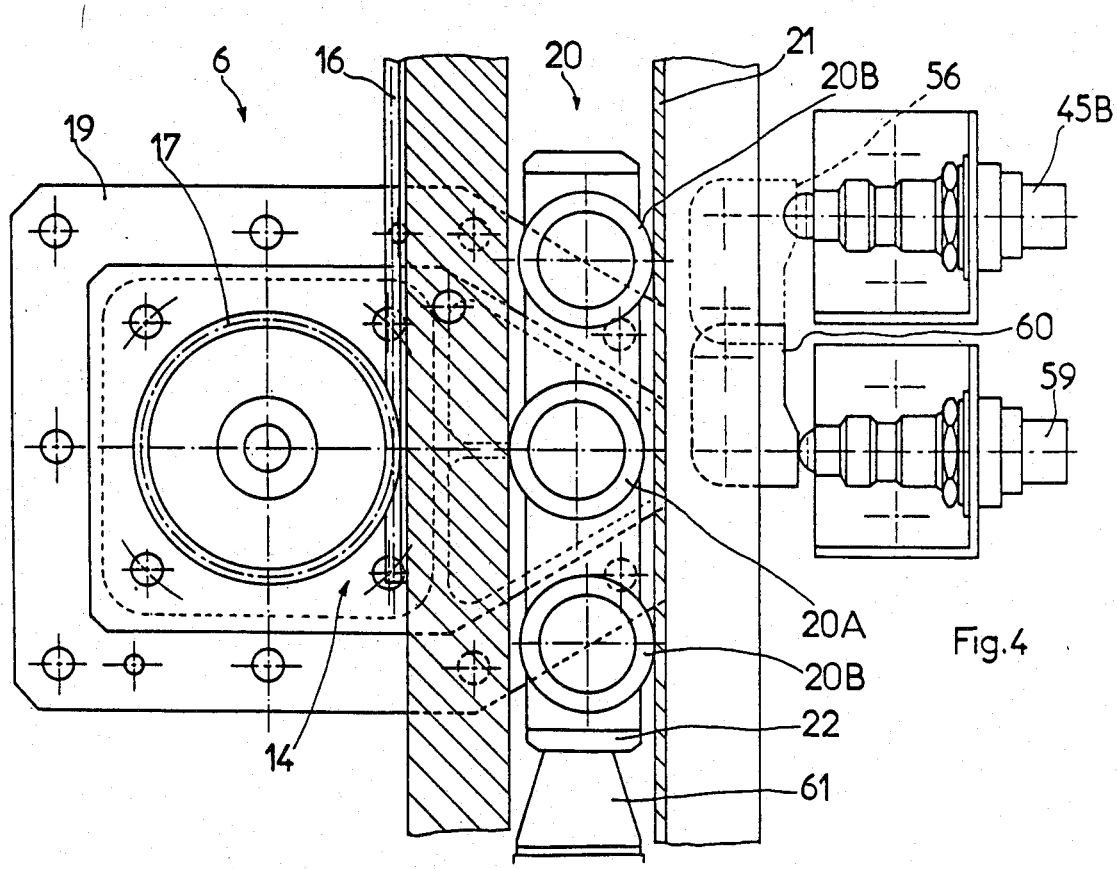

According to a preferred embodiment shown in FIGS. 4 and 5 the set of friction rollers 20 is mounted on the support 19 on which is fixed the motor 18 and the rack 16 is fixed opposite the slide 21 in which is lodged the set of friction rollers 20. This slide 21 preferably has the shape of a U the branches of which are directed vertically toward the base.

The set of friction rollers 20 comprises three friction rollers with parallel and vertical axes being placed in the slide 21. The friction roller 20A disposed between the two friction rollers 20B is supported on a vertical face of the slide 21 in a plane perpendicular to the point of tangency between the rack 16 and the pinion 17.

The friction rollers 20B are mounted on a support common to the friction roller 20A. These friction rollers 20B are designed to bear against the other vertical face of the slide 21. The friction rollers 20A and 20B are rotatably mounted about their axis of vertical rotation.

The support 22 being fixed to the support 19 carrying the motor 18 and the rack 16 being fixed to the side 21, the adjustment of the play of the rack and pinion apparatus 14 is effected by adjusting the space between the friction roller 20A and the shaft of the motor.

To this end, the rotation shaft of the friction roller 20A is mounted in an adjustable eccentric 23. The friction rollers 20B bearing against the other face of the slide 21 laterally guide the carriage 4 at the time of the sliding of this latter in the compartment 1 in combination with the friction roller 20A. There is thus provided an adjustment of the operating play so as to assure a good lateral guiding of the carriage 14 with respect to the slide 21.

The adjustment of the space between the motor 18 and the friction roller 20A that giving rise to the operating play of the rack and pinion device 14, this adjustment is unalterable. Thus the guiding play in the slide 21 is obtained over at least one friction roller 20B.

To this end, the rotation shaft of a friction roller 20B is mounted on an adjustable eccentric 24. The carriage 4 carrying the foldable structure 5 of the staircase slides in the compartment 1 under the action of the rotation of the motor 18 provoking the engaging of the pinion 17 on the rack 16.

The carriage is supported by the wheels 9 of the hubs 10 and the rollers 11 and is guided by the set of friction rollers 20 in the slide 21.

When the carriage 4 has arrived at the end of its course, the motor 18 is no longer driven in rotation. This motor comprises a brake and is of the type which, when it is no longer supplied, the brake functions instantaneously and remains in a position of fixed braking.

The foldable structure 5 of the staircase mounted in overhanging relationship on the carriage 4 may undergo lateral forces when this latter is found in the motion of exiting from or entering into the compartment 1.

These forces entrain a couple on the lateral guiding apparatus of the carriage 4 in the compartment 1 and the said apparatus no longer suffices for correctly guiding the carriage in the said compartment. One of the characteristics of the staircase according to the invention consists in that the said staircase is provided with means permitting the variation of the angle or position of its longitudinal axis with the compartment 1 and about a vertical axis of rotation and means for guiding the carriage 4 with respect to the side rails 5 mounted at the back of the said carriage.

The means permitting the angular variation of the longitudinal axis of the staircase are constituted by the articulated assembly on the carriage 4 with respect to a vertical axis of the device for adjusting the play of the rack and pinion assembly 14 and for the lateral guiding of the carriage 4.

To this end, the body 22 of the set of friction rollers 20 is articulated according to a vertical shaft 25 through the support 19 supporting the motor 18.

This vertical articulation shaft is coaxial with the axis of rotation of the friction roller 20A for adjusting the play of the rack and pinion assembly.

The articulation shaft 25 on the support 19 of the motor 18 constitutes the eccentric 23 for adjusting the play of the rack and pinion assembly 14 and carries a friction collar 26 about which is pivotally articulated the support body 22 for the set of friction rollers 20.

Thus the longitudinal axis of the staircase may assume a variable angular position with respect to the longitudinal axis of the compartment 1 and about a vertical axis of rotation.

When the rotation of the motor 18 is not blocked, the vertical rotation shaft is constituted by the articulation shaft 25 of the body 22 on the support 19.

So that this angular variation will not be braked, the articulation axes of the hubs 10 on the carriage 4 are disposed in a plane transverse to the said carriage and passing through the shaft of the motor 18 and the articulation shaft 25 coaxial with the axis of the friction roller 20A (FIG. 3).

On the other hand, so as to limit the angular variation of the longitudinal axis of the staircase about the vertical axis of rotation 25, the carriage 4 on its back portion is provided with guiding means with respect to the rails 4A.

These guiding means shown in FIGS. 6, 7 and 8 are fixed on each side of the back portion of the carriage 4 and are each constituted by two friction rollers 27 designed to roll against the vertical face of a rail 4A and by a body 28 supporting the said friction rollers and being articulated according to a vertical axis on the carriage 4. The body 28 has two extensions 28A each comprising a friction roller 27 and one of which is in front of the articulation axis of the body 28 on the carriage and the other of which is behind the said articulation axis. When the longitudinal axis of the structure 5 of the staircase is parallel to the longitudinal axis of the compartment 1, there remains a play on each side of the carriage 4 between a friction roller 27 and the rail 4A opposite which it is found.

This play is necessarily compatible with the play of the friction rollers 20B in the central slide 21. The limitation of the variation of the angle or position of the longitudinal axis of the structure 5 of the staircase is given when the two friction rollers 27 of a same body 28 bear against the vertical face of a rail 4A. When the structure 5 rests on the ground or is in the course of deployment or also of folding, that is to say when the carriage 4 is in its ultimate exit position, forces may be exerted either respectively on the vehicle (the structure on the ground being incapable of budging), or also on the structure itself. These forces in these positions are more significant than those being exerted on the structure 5 when this latter exits or re-enters into the compartment 1, because these forces act on greater surfaces.

It is therefore necessary that the vehicle and the staircase have a relative movement with respect to one another so as to relieve their connection of these forces. To this end, the staircase according to the invention comprises means permitting a relative lateral tilting between the longitudinal axis of the vehicle and the means for restoring the said longitudinal axis of the staircase parallel to the axis of the compartment 1 at the time of the re-entry of the said staircase into the said compartment.

These means for lateral tilting and for restoring the position of the staircase in the compartment are constituted by a slot 29 provided in the vertical face of the rails 4A opposite which is found, when the carriage 4 is at the end of its course, the forward friction roller 27 of the rear lateral guiding device of the said carriage 4, through the assembly of support bodies 22 of the friction rollers 20 on the carriage. At the end of the course the motor 18 of the carriage 4 is blocked in its rotation.

Under the action of forces the carriage 4 may pivot about a vertical axis passing in this case from the primary center of the rack and pinion assembly 14.

This primary center is found in the vertical plane containing the longitudinal axis of the staircase.

Thus when a force is exerted on the extremity of the staircase or on the vehicle, the said force may provoke the pivoting of the carriage 4 with respect to a vertical axis which results in the articulation axis of the body 28 carrying the friction rollers 27 being brought nearer to a rail 4A on one side.

This bringing nearer provokes the penetration of the forward friction roller 27 into the slot 29 by rotation about the rear friction roller 27 and of the articulation of the body 28 on the carriage 4. On the other side of the carriage the articulation axis of the body 28 is articulated indirectly to the carriage 4 through the intermediary of an element 30. This element 30 is articulated in a clasp 31 formed at the back of the carriage 4 and on its two sides. Preferably, this element 30 carries on a horizontal shaft 32 the support roller 11 for the carriage 4 which rolls under the horizontal flange of the rail 4A. The roller 11 is mounted opposite the back friction roller 27 for lateral guiding so as not to dampen the pivoting of the body 28 with respect to the carriage 4.

So as to avoid the escape of the roller 11 from the rail 4A under the effect of removal of the articulation axis of the element 30 from the said rail the element 30 is provided with a retention means for the roller 11 beneath the rail 4A. This retention means such as shown in FIG. 8 is constituted by a hook 33 laterally fixed beneath the rail 4A and by a stud 34 against which is hooked the hook 33 in case of significant lateral tilting. The stud 34 is preferably mounted coaxially with the horizontal shaft 32 of the roller 11. Maximum lateral rocking is found when the forward friction roller 27 is in contact with the base of the slot 29.

This slot 29 is formed by an irregularity toward the exterior of the vertical flange of the rail 4A. So as to restore the axis of the staircase the slot 29 is provided with an inclined back portion 29A forward on which at the moment of the insertion of the carriage the forward friction roller 27 rolls and thus restores the staircase in central position in the compartment 1. The slot 29 has, before this inclined portion 29A, a straight line portion 29B, then a portion 29C perpendicular to the axis of the rail 4A.

Nevertheless, it is necessary to determine a force value short of which the relative lateral tilting will not be effected, for at the least relative movement of the vehicle with respect to the staircase, the connection of the one with respect to the other would immediately be free which is not desirable.

The means permitting the relative tilting of the axis of the staircase with respect to the vehicle are each provided with a device determining a threshold force beyond which the tilting is permitted.

This device is constituted by a cam 35 fixed to the body 28 carrying the friction rollers 27, a wheel 36 articulated on the carriage 4 rolling against the cam and a compression spring 37 fixed to the said carriage maintaining the wheel applied against the cam 35 as shown in FIG. 6.

This cam has two rolling courses 35A and 35B. The spring 37 is adjusted in compression and is calibrated to a value corresponding to a threshold at which the relative lateral tilting is authorized. Short of this threshold the wheel 36 is applied on the inclined rolling course 35A.

The force of the contact of the wheel 36 on the rolling course 35A creates a couple with respect to the articulation of the body 28 on the carriage 4. The forces being exerted on the vehicle or on the staircase similarly create a couple about the articulation axis of the body 28 on the carriage 4, which couple results from the contact of the rear friction roller 27 against the rail 4A. So long as the couple of the friction roller 27 on the rail 4A is not greater than the couple of the wheel 36 on the course 35A, the tilting is prohibited. When this force becomes greater than the other the tilting is permitted and the wheel 36 passes to the rolling course 35B.

This rolling course 35B is an arc of a circle the center of which is coaxial with the articulation of the body 28 on the carriage 24. Thus the support of the wheel 36 by the spring 37 does not generate any more force with respect to the axis of articulation. On the back extremity of the rolling course 35B is provided a claw 35C for stopping the wheel 36.

Advantageously the wheel 36 has an adjustable angular course with respect to its articulation through an adjustable stop 38. The exterior forces are absorbed by the flexibility of the connection of the staircase in the compartment 1. The carriage 4 and the foldable structure 5 of the staircase which this former carries are therefore re-centered in the compartment 1 by the apparatus described above. At the end of the re-centering course all the structure is found in the interior of the compartment 1 so that the carriage 4 and the structure 5 are in a fixed and re-centered position, the staircase according to the invention is provided with at least one slidable immobilization means for the said staircase in the compartment 1.

Figure 9:
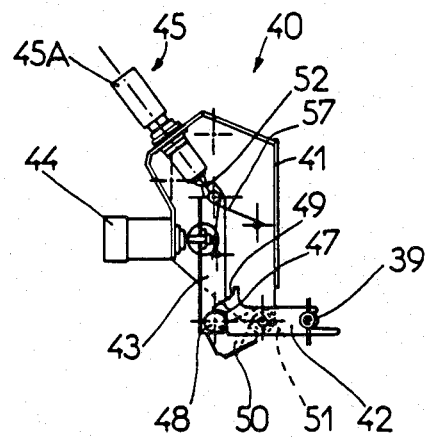
FIG. 9 is a sectional view of the locking device in locked position according to the invention.
Figure 10:
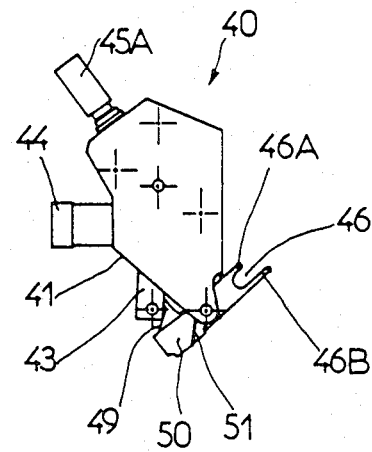
FIG. 10 is a view of this same device in unlocked position.

As shown in FIGS. 9 and 10, the staircase is provided with a single immobilization means constituted by a pin 39 fixed to the extremity of the central slide 21 and by a locking device 40 fixed on the carriage 4 and designed to cooperate with the pin 39.

Preferably the pin 39 is vertically fixed and the locking device 40 is activated on the said pin in a horizontal plane parallel to the carriage 4 on which the said device is mounted.

According to a preferred embodiment, the locking device 40 mounted in a casing 41 fixed on the upper face of the carriage 4 is constituted by a bolt 42 designed to be received by the pin 39, an articulated lever 43 controlling the bolt 42 through a drive mechanism 44 for the lever 43 and at least one contactor 45 detecting the locked state of the device 40.

The bolt 42 is articulated through its middle portion into the casing 41 about a vertical axis.

One of the extremities of the bolt 42 is exterior to the casing 41 and comprises a slot 46 designed to receive the pin 39.

This slot 46 is delimited by two extensions 46A and 46B one of which is longer than the other for reasons which will be explained later on.

The other extremity of the bolt 42 interior to the casing 41 comprises a hook 47 in which is disposed (in locked position) a friction roller 48 fixed to a extremity of the control lever 43. The hook 47 is followed by an inclined claw 49 against which bears the friction roller 48 in unlocked position.

About the articulation axis of the bolt 42 in the casing 41 is mounted a clasp 50 in which is placed the extremity of the bolt provided with the hook 47 in unlocked position under the action of a spring 51.

The control lever 43 is provided at one extremity with a friction roller 48 designed to be placed in the hook 47 of the bolt 42. The lever 43 is mounted articulately in the container 41 on an axis parallel to the axis of articulation of the bolt 42. The articulation axis of the lever is near the other extremity on which is provided a cam 52.

Figure 11:
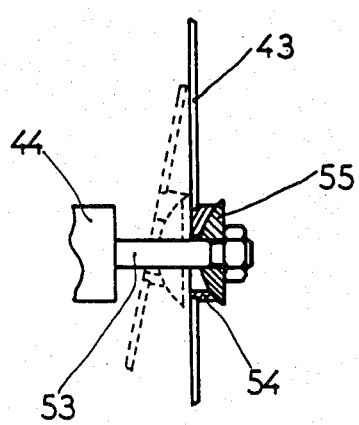
FIG. 11 is the detail A of FIG. 9.

Between the extremity of the lever 43 bearing the friction roller 48 and the articulation axis of the said lever is situated the connection of the lever 43 with its driving mechanism 44. This connection is near the axis so as to amplify the angular movement of the extremity carrying the friction roller 48. The drive mechanism 44 of the lever 43 is preferably constituted by an electromagnet, the movable core of which is extended by a rod 53. The connection between the rod 53 and the lever 43 shown in FIG. 11 is constituted by a bearing 54 fixed on the lever 43 and having a circular transverse section and by a stop 55 fixed on the bearing 53 and having a circular transverse section of the same radius as the bearing 54 so as to be rested on this latter.

The bearing 54 is provided with an opening for passage of the rod 53 provided with the stop 55. The bearing 54 and the stop 55 are made from materials having low coefficients of friction, for example nylon.

Thus when the electromagnet is excited the rod 53 re-enters into the body of the electromagnet and drives, through the rectilinear pulling of the stop 53, the rotation of the lever 43 with respect to its articulation axis in the container so that the bearing 54 slides on the stop 55.

In locked position the pin 39 is lodged in the slot 46 of the finger 42 and the friction roller 48 of the lever 43 is found in the hook 47 of the finger 42 (FIG. 9).

Thus the carriage 4 in re-entered position is blocked in translation and by the pin 39 in the bolt 42 in one direction and by the studs carried by the carriage 4 bearing against the base of the compartment in the other direction.

When the unlocking is controlled to open the shield securing the compartment 1, the electromagnet is energized, which provokes the tilting of the lever 43 with respect to its articulation axis in the container 41.

This tilting provokes the release of the support of the cam 52 of the lever 43 from a contactor 45A mounted on the container 41 which is supported when the carriage 4 is locked.

The release of this contactor 45A causes the operation of the motor 18 of the motor means driving the carriage 4.

The tilting of the lever 43 similarly effects the exit of the friction roller 48 from the hook 47. This hook 47 is immediately sealed by the clasp 50 which is lowered toward the bolt 42 under the action of the spring 51 (FIG. 10). The tilting of the lever 43 thus drives the disengagement from the friction roller 48, the hook 47 and the advance of the carriage 4.

This advance of the carriage 4 permits through the bearing of the pin 39 on the smaller extension 46A of the slot 46 causing to tilt the bolt 42 until the friction roller 49 is found on the inclined claw 49.

The bolt 42 at this instant is in a stable state. Nevertheless the electromagnet is still under tension which is no longer useful, as the friction roller 48 is in contact with the claw 49 of the bolt 42.

The locking device is therefore provided with a second contactor 45B (FIG. 4) determining the position of the carriage 4 and which provokes the cut-off of the energization of the electromagnet when the said carriage has reached a certain position.

Preferably this contactor 45B is mounted on the carriage 4 and is actuated by a cam 56 fixed on the central slide 21.

At the time of the return of the carriage 4 the locking is effected automatically, without any action other than mechanical. The extension 46B of the notch 46 is longer than the extension 46A and enters into contact with the pin 39, which causes the tilting of the bolt 42, and the rolling of the friction roller 48 on the claw 49 of the bolt 42.

Next the extremity of the lever 43 repels the clasp 50, while under the effect of tilting of the bolt 42, until the friction roller 48 is able to penetrate into the hook 47 of the bolt 42. The penetration of the friction roller 48 is urged by a spring 57 acting on the lever 43.

The end of course of the carriage 4 is determined by the contactor 45B actuated by the cam 56. The contactor 45A, being again actuated by the cam 52 of the lever 43, causes the closing control of the hatch of the compartment 1.

So as to extract the structure 5 from the compartment 1 the movable carriage is displaced toward a forward position from a rear position according to which the carriage is disposed in the proximity of the base of the compartment and according to which the structure 5 is housed entirely in the compartment.

Following the forward position, the carriage 4 is disposed at the level of the opening 3 and the structure 5, prior to deployment, is extended outside of the compartment.

In exit position and when the foldable structure 5 is not unfolded, the carriage 4 is not locked and is checked in position on by the brake of the motor 18.

This stoppage of the motor 18 and its braking are provided by a contactor 59 carried by the carriage 4 and by a cam 60 fixed on the central slide 21 and through which is actuated the contactor 59. This contactor 59 is mounted parallel to the contactor 45B for the end of course, and the cam 60 has a profile identical to that of the cam 56 for the end of course, as is shown in FIG. 3.

Preferentially, the longitudinal axis of the contactor 59 is disposed in the plane where the articulation axes of the hubs 10, the axis of rotation of the pinion 17 of the rack and pinion apparatus 14 and the axis of the friction roller 20A are found.

This positioning of the contactor 59 in this plane avoids its changing of state at the time of relative movement of the staircase with respect to the vehicle.

In this exit position the carriage 4 comes in contact, on its forward portion, with a stopper 61 (FIGS. 4 and 5).

When the contactor 59 for the end of course carriage detects the cam 60, the motor 18 is severed and braked, and the motor means 7 for unfolding the foldable structure 5 of the staircase are set in action.

The foldable structure 5 is articulated between the side flanks 8 of the carriage 4 and on the forward portion of this latter.

The said structure is constituted by a first staircase section or upper section 62 pivotally mounted through its upper extremity on the movable carriage 4, by a second staircase section or lower section 63 articulated on the lower extremity of the preceding along a horizontal axis and by two foldable guard rails 121 each articulately laterally mounted to the upper section 62 and to the lower section 63.

Under the action of the motor means 7 the structure is capable of being deployed or re-folded outside the compartment 1. When the structure is deployed the lower staircase section 62 concurs in the extension of the upper section and through its lower extremity is in contact with the ground. In this position the staircase sections 62 and 63 are inclined from the ground toward the door of the fuselage. While in this position, the guard rails 121 are erect on the staircase sections 62 and 63.

When the structure is folded the lower staircase section 63 is folded under the upper section 62 and the guard rails 121 are folded laterally from each side of the two sections.

The lower section 63 is of a length less than that of the upper section 62 so as to be completely outside the compartment 1, when the carriage 4 is in its forward position, so as to be able to be deployed or to be re-folded under the upper section 62 by rotation about the axis of articulation.

Each section 62 and 63 is constituted by two hollow, parallel beams 64, spaced by the steps.

Preferably, the two beams each have a right rectangular section and are constituted from corrugated iron. The steps 65, realized in honeycombed "sandwich" are covered with an anti-skid material.

It will readily be seen that the steps 65 are each disposed along oblique planes to the longitudinal axis of the compartment so as to be horizontal when the structure 5 is deployed.

Figure 12:
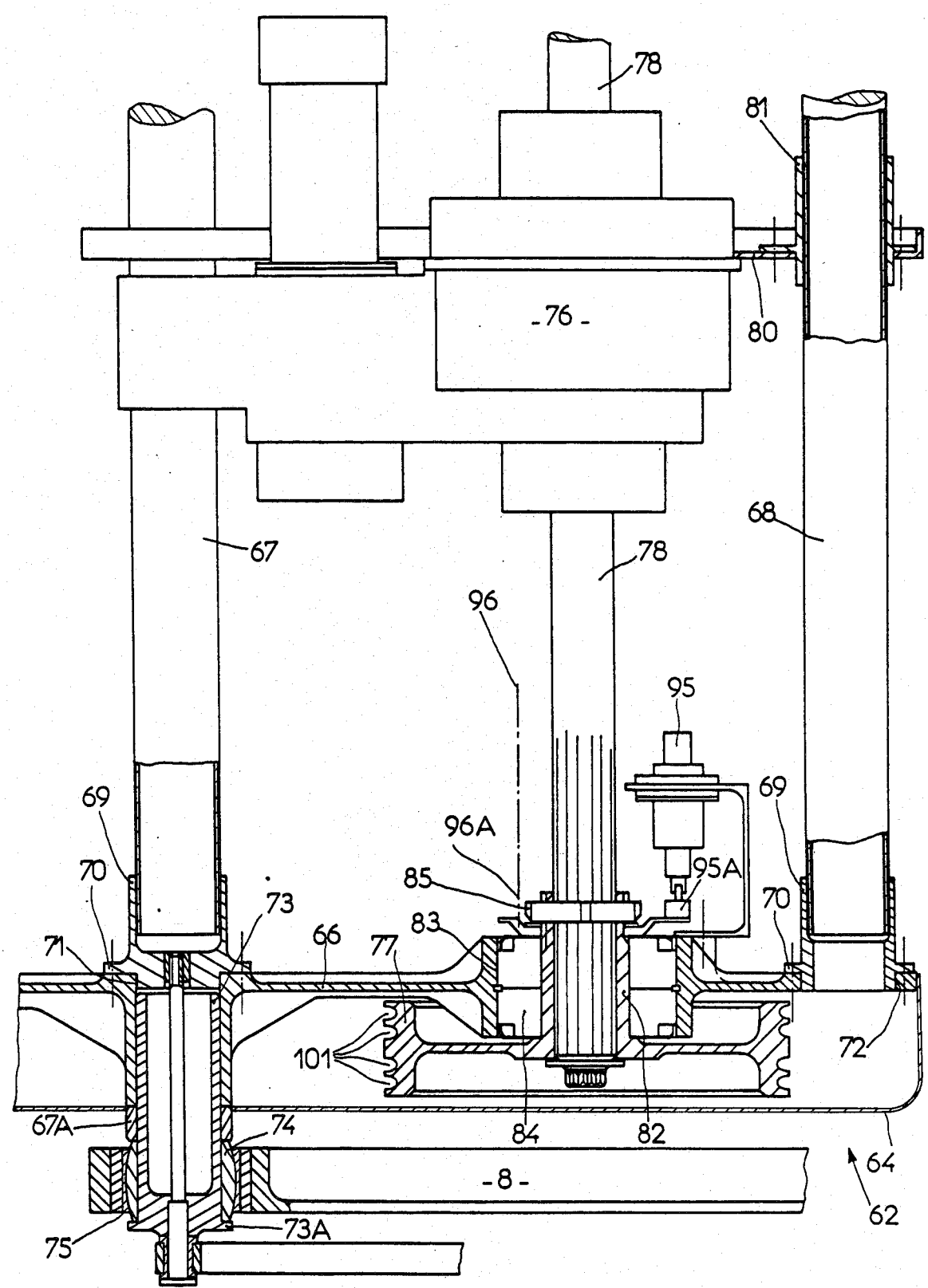
FIG. 12 is a view from above of the motor means for folding and unfolding the foldable structure of the staircase and for the articulation of the said structure on the carriage according to another improvement according to the invention.

The staircase structure 5 is articulated between the flanks 8 of the carriage 4 by the upper extremity of the upper section 62. The lower and upper sections 63 and 62 are rectilinear over all their length and the upper section 62 comprises on its upper extremity a reinforcing structure 66 inclined toward the base with respect to a section 62 and parallel to the steps 65. On this structure 66 is fixed the last step 65 of the staircase. This structure 66 is fixed on each of the interior faces of the upper beams 64 which have a portion inclined toward the base. The beams 64 are braced by two parallel shafts 67 and 68 one of which is coaxial to the axis of articulation of the section 62 on the carriage 4 (FIG. 12).

Each shaft 67 and 68 is provided on its extremities with a cylindrical sleeve 69 fixed, through a flange 70, into bores 71 and 72 provided respectively in the forward portion and in the rear portion of the reinforcing structures 66 for the beams 64. The bores 71 with respect to which is fixed the forward shaft 67 are provided over a great length relative to the bores 72. The bores 71 are designed to receive a hub 73 fixed in the base of the sleeve 69 coaxially to the shaft 67 and carrying on their other extremity a swivel joint 74 designed to be mounted in a bearing 75 provided on the forward extremity of the side flanks 8 of the carriage 4. The swivel joint 74 is preferably delimited between a shoulder 73A provided on the hub 73 and a spacer 67A bearing against the said swivel joint and the edge of the bore 71.

The foldable staircase structure 5 is rotatably mounted between the flanks 8 of the carriage 4 with respect to the axis defined by the forward shaft 67. Between the shafts 67 and 68 are mounted the motor means 7 for folding and unfolding the foldable structure 5.

These motor means 7 as shown in FIGS. 12 to 15 are constituted by a motor 76 equipped with a motoreducer, by at least one circular chuck 77 fixed to an output shaft 78 of the motor and by at least one connecting rod 79 articulated between a chuck 77 and a side flank 8 of the carriage 4.

The motor 76 is mounted between the shafts 67 and 68 and in the middle portion of these latter on a cradle 80. The said cradle is mounted on the shafts 67 and 68 through the intermediary of collars 81 fixed on the said shafts.

The cradle 80 is constituted by a wall comprising on its periphery a perpendicular reinforcement. The said cradle has an impression 80A of a circle portion designed to receive the motor 76 which may be positioned with respect to this cradle. The motor 76 is of the electric type and is of the type of those provided with a brake acting as soon as the motor is no longer energized.

Advantageously this motor is provided with a manual control constituted by a square shape 76A oriented so as to be accessible between two steps 65 of the staircase. Preferably the motor 76 is provided with two coaxial output shafts 78 preferably grooved, to the extremity of each of which is mounted a chuck 77.

As is shown in FIG. 11, each of the chucks 77 is disposed in the interior of the beam 64 of the upper section 62 and beyond the reinforcement structure 66. This circular chuck 77 has in its center an interiorly grooved hollow cylindrical span 82 designed to receive the shaft 78 and to be guided in rotation in a bore 83 provided on the structure of the reinforcement 66.

The guiding in rotation of the chuck 77 is realized by a bearing 84 mounted in the bore 83. The said chuck is blocked from translatory movement on the shaft 78 in a known manner, for example by the intermediary of a screw nut 85 screwed on the span 82 and blocking the said chuck between the edges of the interior ring of the bearing 84. So as to be able to mount this chuck 77 there is provided in the flanks 8 of the carriage 4 an oblong opening 8A.

Figure 15:
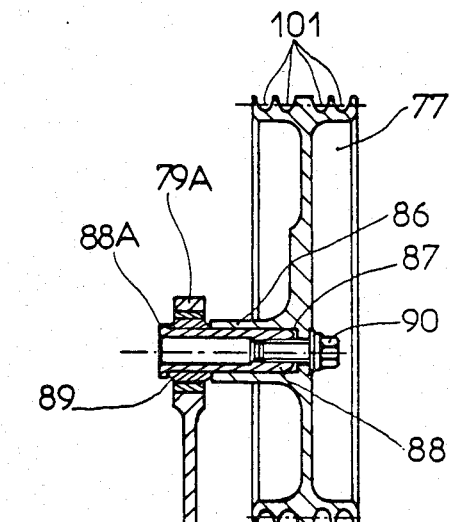
FIG. 15 is a sectional view of the connecting rod for the motor means for folding and unfolding the foldable structure of the staircase.

Between each chuck 77 and a side flank 8 of the carriage 4 is articulated the connecting rod 79. The said connecting rod is articulately mounted by its head 79A on the chuck 77. The said chuck comprises to this end an extension 86 provided at a predetermined distance from the center of the chuck (FIG. 15). It will readily be understood that the distance between the axes of the extension 86 and of the center of the chuck 77 define a crank arm.

The extension 86 is provided with a shouldered, bored opening 87 designed to receive a sleeve 88 comprising a swivel joint 89 on which is mounted the connecting rod 79 by its head 79A.

The sleeve 88 is mounted in the orifice 87 of the extension 86 by a screw 90 and the swivel joint 89 is enclosed between the planar face of the extension 86 and a shoulder 88A provided on the sleeve 88.

The head 79A of the connecting rod 79 is mounted on the swivel joint 89 by an adapted sliding ring. The extension 86 of the chuck 77 opens to the exterior of the beam 64 and the side flank 8 of the carriage 4. The foot 79B of the connecting rod 79 is mounted on a stud 91 fixed on the flank 8 of the carriage 4. The foot 79B comprises an oblong opening 92 extended in the axis of the connecting rod 79.

On the stud 91 is retained a swivel joint 93 on which is mounted a ring 94 adapted to the said swivel joint. The connecting rod 79 is mounted by its foot 79B on the ring 94 and is guided in translation with respect to this ring 94 by two surface planes provided on the said ring and bearing against the edges of the oblong opening 82. The connecting rod is blocked from translation along the axis of the stud 91 by the ring 94 on one side, which comprises a collar 94A and by a screw 94B on the other side being tightened on the ring 94.

It goes without saying that the collar 94 and the screw 94B are of a diameter greater than the width of the oblong opening 92. The connecting rod 79 is mounted on its articulation so as to be parallel to the flank 8 of the carriage 4 and to the beam 64 of the upper section 62.

The foldable staircase structure 5 is therefore mounted in an overhanging manner and articulately on the carriage 4 and the motor means 7 permit its folding and unfolding.

When the carriage 4 arrives at its forward end of its course, the contactor 59 carried by the said carriage is actuated by the cam 60 fixed on the central slide 21. This actuation of the contactor 59 controls the actuation of the motor means 7.

The foldable staircase structure 5 is found in a horizontal position, with the lower section 63 under the upper section 62, when the carriage 4 is in exit position. In this horizontal position, the staircase structure 5 creates by its weight a couple with respect to its axis of articulation on the carriage 4.

In order to maintain the structure in horizontal position a resisting force opposed to the force created by the stoppage of the motor 76 of the motor means 77 and by the connection of the connecting rod 79 between the chuck 77 and the carriage 4.

Under the effect of the weight of the structure there is created a traction force on the connecting rod 79 which results in the maintenance of the said connecting rod in contact with the stud 91 of the carriage 4.

When the motor 76 is not actuated, the foldable structure 5 is in a stable position.

As soon as the motor receives the command to function (command given by the contactor 59 actuated by the cam 60) the chuck 77 is driven in rotation.

The rotation of the chuck 77 is in the same direction as the couple created by the weight of the structure.

This rotation tends to contract the distance between the heads 79A of the connecting rod 79 articulated on the chuck 77 and the foot 79B articulated on the carriage but the weight maintains this distance always the same.

The head 79A of the connecting rod 79 is driven in rotation with respect to the axis of the chuck 77 and with respect to the axis of the stud 91 of the foot 79B.

The weight of the foldable structure 5 therefore drives the rotation shaft of the chuck 77 and thus itself generates its own tilting with respect to its articulation on the carriage 4. The speed of unfolding of the structure is proportional to the speed of rotation of the chuck 77.

The motor means 7 thus have great safety, as in case of a cut-off of the power supply of the motor 76 the foldable structure remains in a fixed position.

The angular course of the structure 5 is given by the length of the connecting rod 79 and the value of the distance separating the head 79A of the connecting rod from the axis of rotation of the chuck 77.

This angular course may vary as a function of the variations of height between the vehicle and the ground on which the lower extremity of the staircase takes support.

As soon as the lower extremity of the staircase touches the ground, the said staircase is in a fixed position.

The variation of the angular course of the staircase is permitted by the oblong orifice 92 of the foot 79B of the connecting rod 79 through which is articulated the said connecting rod on the stud 91 of the carriage 4.

In the case where the distance between the ground and the vehicle is the smallest provided for, the staircase is in a fixed deployed position, even if the chuck 77 has not finished its rotation, the said chuck finishes its course by pushing the connecting rod 79 such that this latter slides onto the stud 91.

The variation of the provided angular course of the staircase is sufficient to accept the possible variations of height between the ground and the vehicle. It is evident that the rotation of the chuck takes place over an angular range corresponding to the maximum height provided for between the ground and the vehicle and giving the maximum inclination of the staircase.

To refold the staircase structure 5 the chuck 77 is driven in rotation opposite to the direction of deployment which results in causing a traction effort on the connecting rod 79 greater than the couple created by the weight of the structure 5.

The ends of rotation of the chuck 77 in deployment and folding are given respectively by the contactors 95 and 96 fixed on the reinforcing structure 66 (one of the contactors is shown in phantom line) and actuated by the cams 95A and 96A fixed in rotation with the chuck 77 (one of which is found in the extension of the phantom line), (FIG. 12).

At the time of the tilting of the staircase structure 5 during the unfolding phase, the lower section 63 diverges angularly from the upper section 62 with respect to its articulation on this upper section.

According to yet another characteristic of the staircase according to the invention, the motor means 7 for unfolding and folding the structure comprises at least one apparatus for transmitting the movement to the lower section 63 with respect to its articulation to the upper section 62.

The motor means 7 for folding and unfolding the staircase comprise two chucks 77 and two connecting rods 79, the invention therefore providing two devices for transmitting the movement to the lower section 63 on its articulation to the upper section 62.

It will be evident that for reasons of clarity only one of these devices will be described.

These devices are each constituted by at least two cables 97 and 98 at least one of which permits the deployment of the structure 5 and the other or others its folding, by a pulley 99 mounted coaxially to the articulation of the section 62 and 63 and on which are fixed the extremities of the cables 97 and 98, by the chuck 77 to the periphery of which is fixed the other extremity of the said cables and by sliding sleeves 100 for the cables disposed between the pulley 99 and the chuck 77.

Preferably the apparatus comprises two pairs of cables 97 and 98 one of which permits the deployment of the lower section 63 and the other of which permits its folding.

The pulley 99 to which is fixed the extremities of the cables 97 and 98 is disposed in the beams 64 of the lower and upper sections 63 and 62, coaxially to the connection of these latter.

The pulley 99 comprises grooves 101 in which are guided the cables 97 and 98.

The chuck 77 similarly comprises on its periphery grooves 101 for the cables 97 and 98.

The grooves 101 of the chuck 77 and of the pulley 99 are aligned the ones with the others such that the cables 97 and 98 are parallel to the beams 64 and between them.

The rotation of the chuck 77 must similarly drive the deployment and the folding of the lower section 63.

The direction of rotation of the lower section 63 about its articulation is always opposite to that of the upper section 62.

It is therefore necessary that the direction of rotation of the pulley 99 be opposite to that of the chuck 77.

To this end, the pair of cables 97 is wound on the chuck 77 and on the pulley 99 in the opposite direction to the pair of cables 98 and is wound on the chuck 77 in the same direction as the pulley 99.

Figure 13:
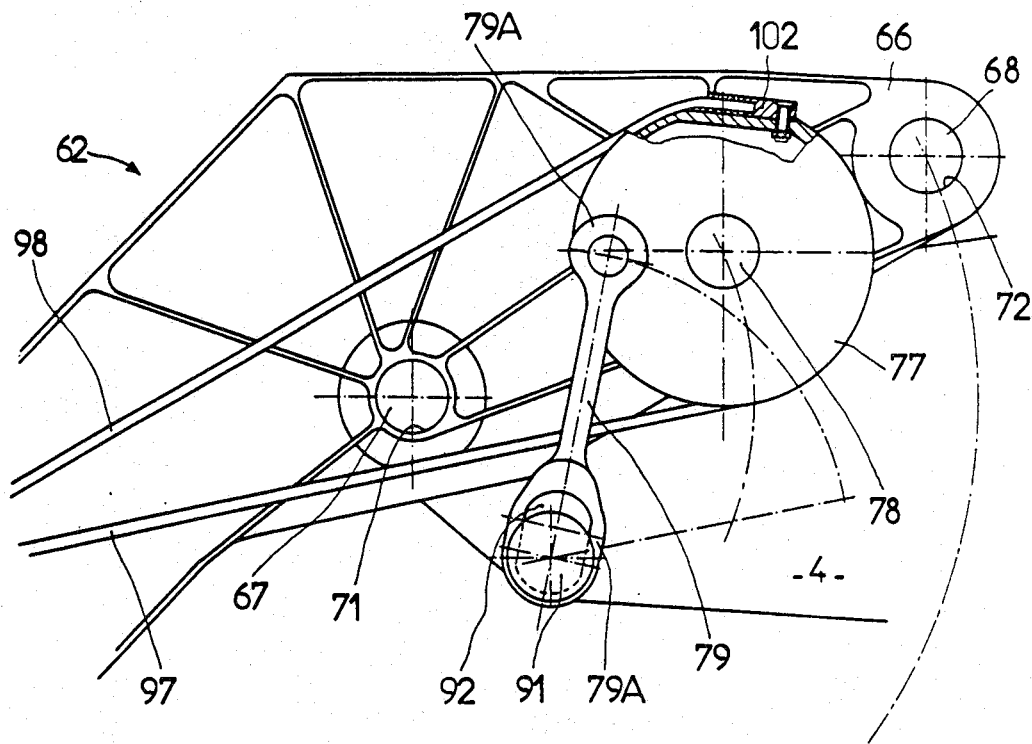
FIG. 13 is a side view of the said motor means shown when the foldable structure is deployed.
Figure 14:
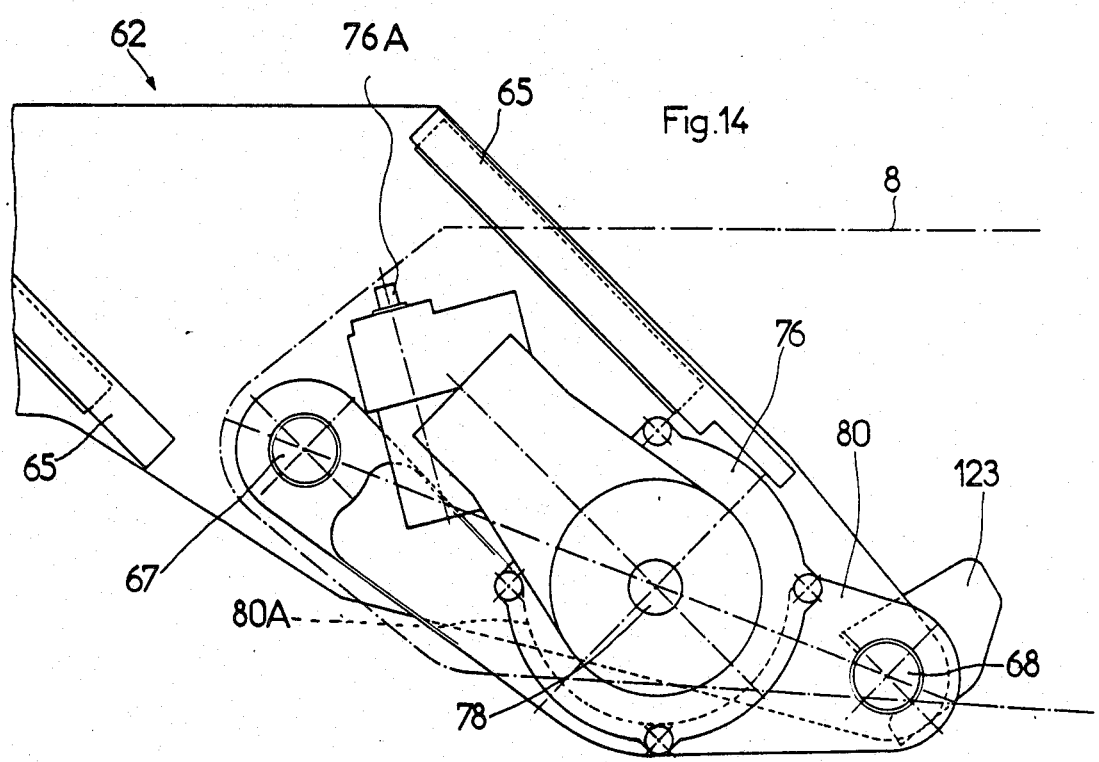
FIG. 14 is a side view of the assembly of the motor means on the foldable structure of the staircase according to the invention.

The pairs of cables 97 and 98 are fixed by the pair in elements 102 mounted on the chuck 77 and the pulley 99 by any known means, for example by screwing (FIG. 13).

The place for fixing the elements 102 on the chuck 77 and the pulley 99 is determined according to the angular course of the chuck 77 corresponding to the overall deployment of the staircase.

The cables 97 and 98 are held between the chuck 77 and the pulley 99.

The path of the pairs of cables 97 and 98 not being rectilinear, the sliding sleeves 100 guide the cables in the beam 64 between the chuck and the pulley 99.

So as not to fold the cables 97 and 98 it is necessary that the sliding sleeves 100 have a large radius of curvature.

To this end, the sliding sleeves 100 are constituted by a plurality of friction rollers 103 the axes of rotation of which are disposed along an arc of a circle having a large radius of curvature.

The sliding sleeves 100 are different for each pair of cables 97 and 98 and are advantageously two per each one between them.

The said sliding sleeves are disposed side-by-side as shown in FIGS. 23 to 26 and the friction rollers 103 have a common central support.

The said friction rollers 103 are each provided with two grooves 104 in which are housed the cables.

In order that the said cables may not be dislodged from the grooves 104, checks 105 fixed to the beam 64 maintain the cables in their groove 104.

These rolling sleeves are mounted in supports 200 fixed to the beam 64.

Advantageously, each pair of cables 97 and 98 comprises an extension piece for adjusting their tension.

Thus, at the time of the rotation of the chuck 77 to fold or unfold the staircase structure 5, there is exerted on a pair of cables 97 or 98 a traction which drives the pulley 99 in rotation opposite to that of the chuck 77.

This rotation is favored by the weight of the lower section 66 at the time of deployment of the staircase structure 5.

The articulation between the sections 62 and 63 is realized at the level of the beam 64 between each of them.

Each beam 64 of the lower section 63 is provided with a tab 106 inclined toward the base formed from two flanks 106A and each beam 64 of the upper section 62 is similarly provided with a tab 107 inclined toward the base and similarly formed from two flanks 107A.

Preferably the tab 106 is encased with play between the flanks 107A of the tab 107 of the upper section 62.

Figure 17:
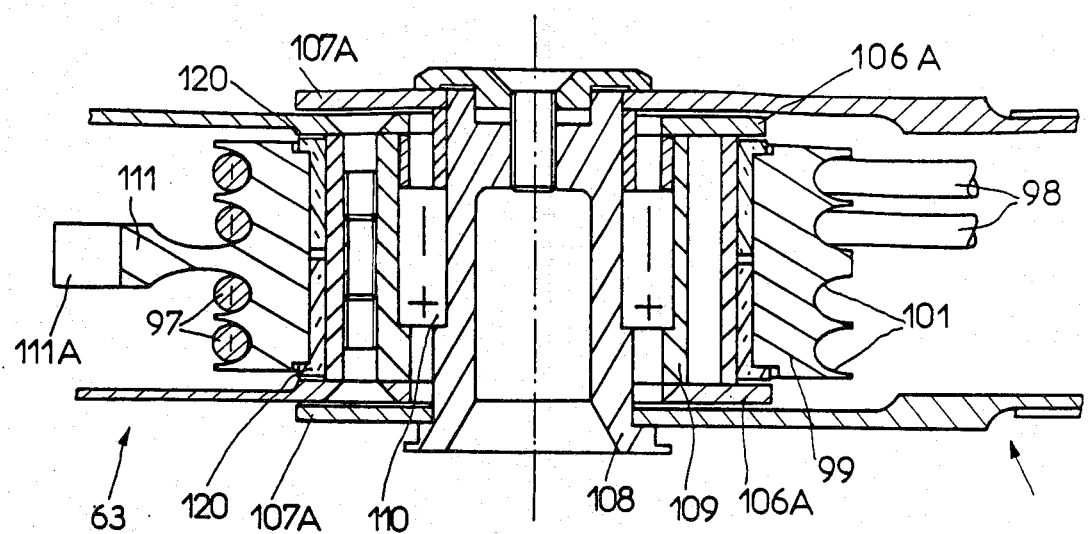
FIG. 17 is a sectional view along the line B—B of FIG. 16.

As shown in FIG. 17, these tabs 106 and 107 are articulately connected by a hub 108 fixed to the tab 107 of the upper section 62, by a ring 109 fixed to the tab 106 of the lower section, by a bearing 110 mounted between the hub 108 and the ring 109 and by the pulley 99, on which is wound the cables 97 and 98, mounted on the ring 109.

According to a preferred embodiment the pulley 99 does not directly drive the lower section 63 in rotation owing to the fact that the sections 62 and 63 must be totally deployed, that is to say in extension the one from the other before the staircase enters into contact with the ground.

The pulley 99 must therefore be able to slip on the articulation ring 109 until the chuck 77 has finished its rotation, the staircase being able already to be in contact with the ground.

On the other hand, for reasons of safety, the upper and lower sections 62 and 63 must be locked together.

To this effect, according to the invention, the staircase between the sections 62 and 63 is provided with at least one system for driving and locking of the lower section 63 with respect to the upper section 62.

Preferably, the staircase comprises a system for driving and locking on each of the articulations realized between the beams 64 and the sections 62 and 63 such as described above.

Figure 18:
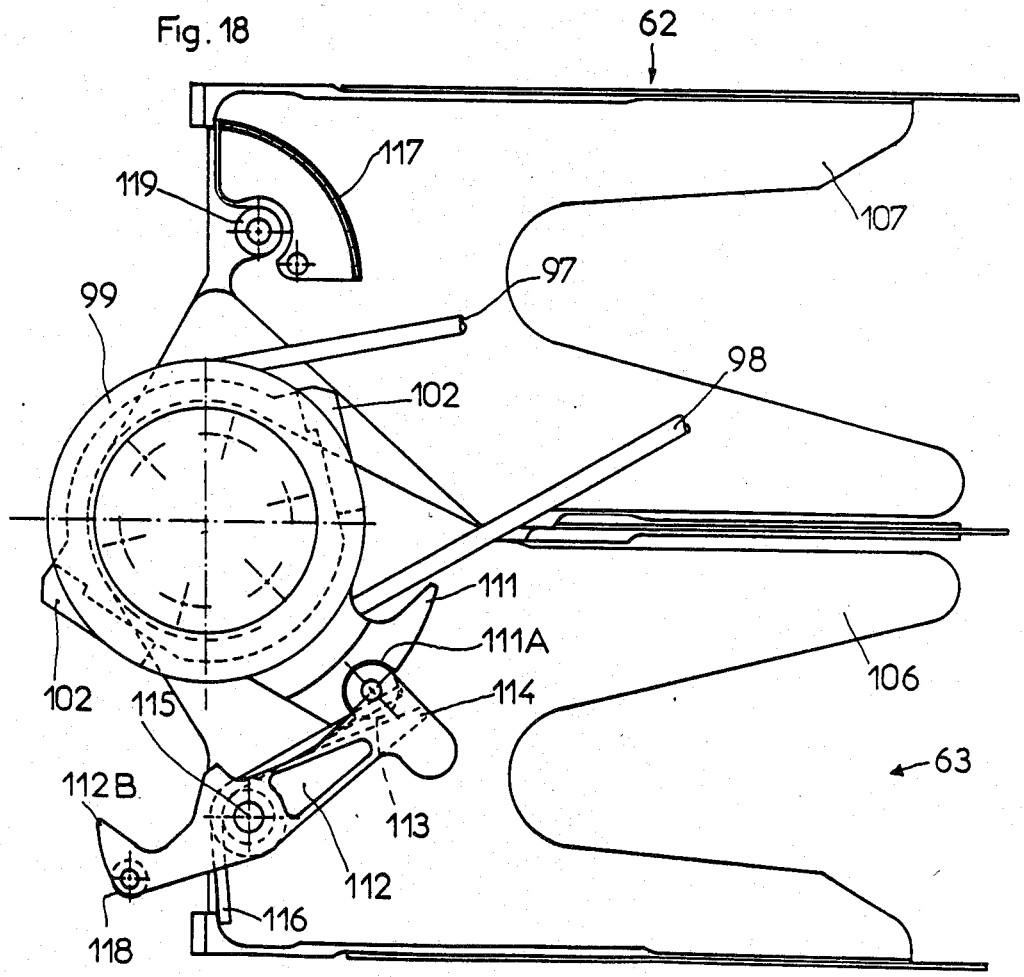
FIG. 18 is a side view of the articulation between sections when the latter are folded.

This driving and locking system for the lower section 63 with respect to the upper section 62, as shown in FIGS. 16 and 18, is constituted by a driver 111 fixed to the pulley 99, by a bolt 112 articulated on the lower section and cooperating with a driver 111, by an actuating mechanism and a mechanism for locking the bolt 112 fixed to the upper section 62, by an elastic mechanism for maintaining the bolt in cooperation with the drivers 111 and by a sliding assembly for the pulley 99 in the articulation between the sections 62 and 63.

According to a preferred embodiment the driver 11 is provided on the pulley 99 between the grooves 101 of this latter. The said driver forms an integral part of the pulley 99 but it will be evident that it could be added on the said pulley and fixed by any known means, for example screwing.

The upper surface of the driver 111 with which the bolt cooperates, comprises a slot 111A and is rounded according to a radius of curvature the center of which is the axis of rotation of the pulley 99.

Preferably, the slot 111A is semi-circular and is adapted to receive a friction roller 113 mounted for free rotation on the foot 114 of the bolt 112.

The said bolt is articulately mounted on the lower section 63 on a shaft 115 transverse to the beam 64 in which is found the driving and locking system.

The friction roller 113 is maintained in contact with the driver 111 by an elastic adjustment mechanism. This adjustment mechanism is preferably constituted by a torsion spring 116 exerting a pressure on the friction roller 113 in the forward extremity of the beam 64 and mounted about the axis of articulation 115 of the bolt 112.

According to another embodiment, the adjustment mechanism may be constituted by a compression spring mounted between the foot 114 of the bolt 112 and the beam 64 of the lower section 63.

As shown in FIG. 18, when the staircase structure is folded the friction roller 113 is housed in the slot 111A and is maintained therein by the spring 116.

As soon as the pulley 99 is driven in rotation by the traction on the cables 97, the lower section 63 is driven in rotation by the driver 111 which exerts, through the intermediary of the bolt 112, a couple on the said lower section with respect to the articulation of this latter on the upper section 62.

In the case where the chuck 77 would be stopped in its rotation for whatever reason, the lower section 63 will remain in the position where it would be found at the moment of stoppage, as the friction roller 113 is maintained in the slot 111A of the driver 111 and the pulley 99 may not turn, as the cables 97 retain it.

Thus, this driving system has great safety for the protection of the staircase and its users.

Figure 19:
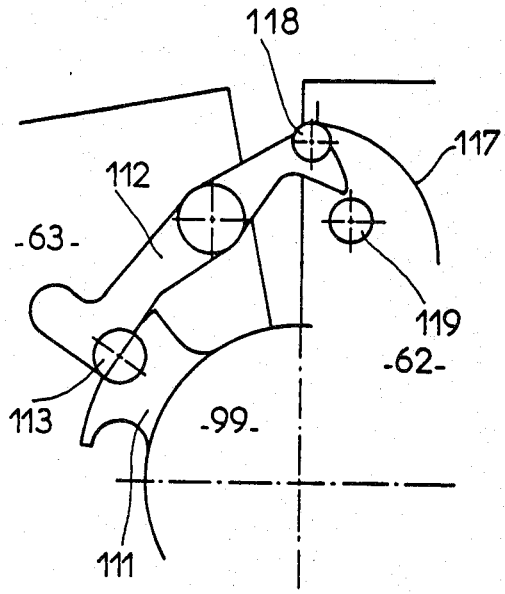
FIGS. 19 to 22 are schematic views of the stages for locking the sections the one to the other.

At the time of the movement of deployment, the bolt 112, when the lower section 63 has attained a certain angular position with respect to the upper section 62, is actuated pivotally about its axis 115 by an actuating driving mechanism and is blocked on an actuating and locking mechanism mounted on the upper section 62 (FIG. 19).

The actuating mechanism for the bolt 112 is constituted by a ramp 117 mounted on the upper section, having a profile of an arc of a circle the axis of which is parallel to the axis of articulation 115 of the bolt 112 and on which may roll a friction roller 118 carried by the head of the bolt 112.

Figure 20:
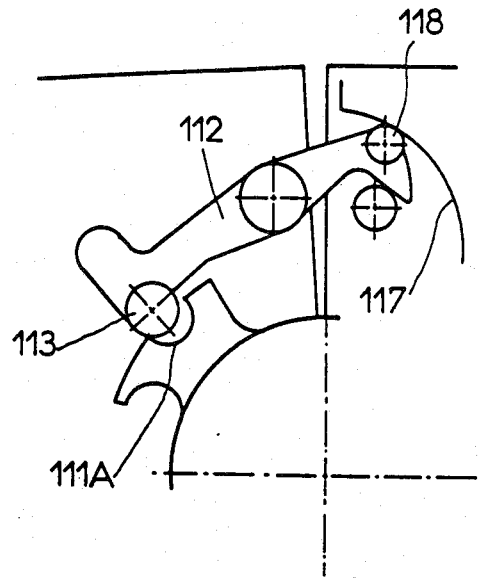

The support and the rolling of the friction roller 118 is realized at the time of angular movement of the lower section 63 in the deployment phase and causes the tilting of the bolt 112 about its axis 115 (FIG. 20). This tilting causes the exit of the friction roller 113 from the slot 111A. The curvature of the ramp 117 is chosen so as to provoke the exit of the friction roller 113 in a progressive manner from the slot 111A.

The locking mechanism for the bolt 112 is constituted by a rod 119 parallel to the axis 115 of the said bolt and situated opposite the ramp 17 under the upper section 62. The head of the bolt 112 comprises a catch 112B passing between the ramp 117 and the rod 119 at the time of angular movement of the lower section 63. The surface of contact of the driver 111 with the bolt 112 is less great in proportion to the exit of the friction roller 113 from the slot 111A.

The driving of the lower section 63 nevertheless continues to take place, the force exerted by the spring 116 increasing. Starting from a certain angular position between sections, the catch 112B enters into contact with the rod 119, the friction roller 119 being always in contact with the ramp 116.

Figure 21:
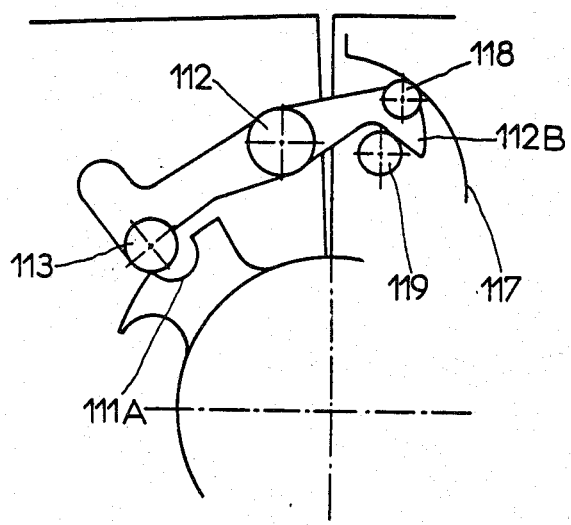

The locking of the lower section 63 is realized when the contactor between the rod 119 and the catch 112B is beyond the line passing through the axis of articulation of sections 62 and 63 and the axis of the rod 119 and when the axis of the friction roller 118 is similarly beyond that line (FIG. 21).

The movement of the locking corresponds to a rotation of the pulley 99 of about 180°. At that instant, the beams are nevertheless not yet in alignment and the friction roller 113 is not yet all the way out of the slot 111A.

Figure 22:
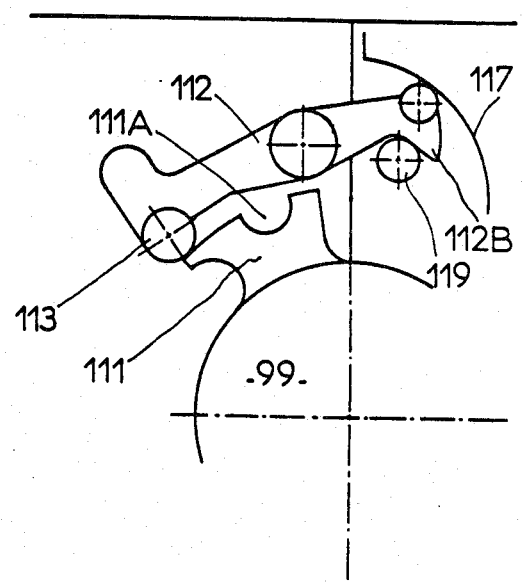

The rotation of the pulley 99 continues, the contact between the catch 112B of the bolt and the rod 119 being maintained. The sections 62 and 63 come in contact the one against the other, which corresponds to the end of locking and to the total exit of the friction roller 113 from the slot 111A (FIG. 22). Nevertheless, the pulley 99 continues its rotation, as the chuck 77 is always driven in rotation even if the staircase is already in contact with the ground. The pulley 99 is therefore mounted on the ring 109 of the articulation on a sliding or rolling element which permits it to finish its rotation even if the sections are locked. Preferably, the pulley 99 is mounted on journal bearings 120 fixed on the ring 109. This driving and locking system for the lower section 63 on the upper section 62 permits being assured that the said sections are in alignment the one with the other and locked the one to the other before the staircase touches the ground. At the time of folding of the structure, the angular movement of the lower section 63 with respect to the upper section 62 commences only when the friction roller 113 of the bolt 112 is in the slot 111A of the driver 111, that is to say when the pulley 99 has effected a slight rotation with respect to the ring 109 or always when the chuck 77 has turned and has already begun to drive the staircase structure 5 thereby to detach the said staircase from the ground.

At the moment of the stoppage of the rotation of the chuck 77 in the folding phase controlled by the contactor 96 and the cam 96A the lower section 63 is found layered beneath the upper section 62.

As previously recited, the staircase structure 5 is provided with two lateral guard rails 121.

Under the action of the relative rotation of the two sections of the staircase, at the time of folding or unfolding, the two guard rails are folded or are deployed simultaneously with the folding or deployment of the structure 5. Preferably, each guard rail 121 is constituted by a main length in two sections of main lengths articulated the one to the other, an upper section 201 and a lower section 202, by an intermediate rail in two sections of rail articulated the one to the other, an upper section 203 and a lower section 204, by two upper uprights 205 and 206 articulated to the upper section 62 of the staircase, to the upper section 201 of the main rail and to the upper section 203 of the intermediate rail, and by a lower upright 207 articulated to the lower section 63 of the staircase and to the lower sections 202 and 204 of the main rail and the intermediate rail, respectively. When the structure is deployed the lower section of the intermediate rail comes to be disposed in the extension of the upper section of intermediate rail. The uprights 205 and 206 come to be disposed perpendicularly to the upper section 62 of the staircase.

The lower upright 207 is preferably inclined forwardly with respect to the lower section 63 of the staircase. When the staircase structure is folded the lower section of the main rail, the lower section of the intermediate rail are folded under the upper section of the main rail and the intermediate rails. Moreover, at the end of folding the upper and lower sections of the main rail and of the intermediate rail and the uprights 205, 206 and 207 come to be disposed laterally to the staircase sections 62 and 63.

Figure 2:
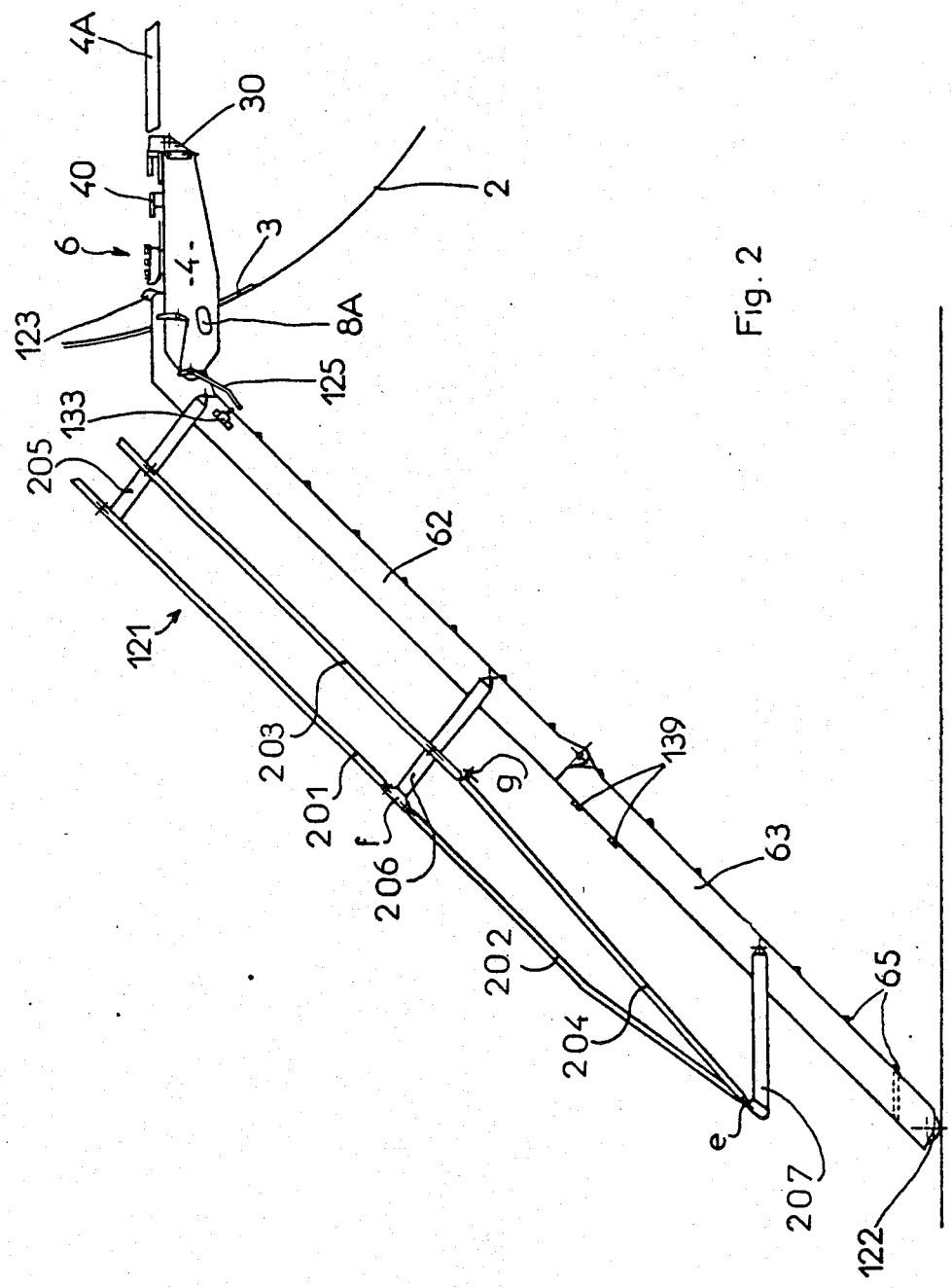
FIG. 2 is a side view of the staircase provided with inprovements according to the invention shown in deployed position.

The uprights 205 and 206 are articulated through their lower extremity to the upper section 62. As can be seen in FIG. 2, the point of articulation of each upright to the upper section is remote from the articulation axis between sections, that is to say is remote from the lower extremity of the upper section 63.

Through their upper extremity the uprights 205 and 206 are articulated to an upper section 201 of the main rail. Between the upper section 201 of the main rail and the upper section 62 of the staircase, the uprights 205 and 206 articulately receive the upper section 203 of the intermediate rail. The upper section 201 of the main rail, the upper section 203 of the intermediate rail, the upper section 62 of the staircase define with the uprights 205 and 206 a deformable parallelogram which at the time of folding of the structure is deformed toward the articulation axis between sections. The lower section 204 of the intermediate rail is shorter than the lower section 202 of the main rail.

The lower extremities of these two sections are articulated one to the other and to the upper extremity of the upright 207. The upper extremity of the section of the main rail 202 and the lower extremity of the section of the main rail 201 are articulated one to the other and to the upper extremity of the upper upright situated at the 5 closest to the articulation axis, that is to say the upright 206.

Moreover, the lower section 204 of the intermediate rail is articulated to the upper section 203 of the intermediate rail in a point situated between the articulation point of this latter section to the upright 206 and between the articulation point to the upright 207.

In other words, the intermediate rail has a folding joint between the upright 207 and the upright 206.

The lower section 202 of the main rail and the lower section 204 of the intermediate rail each form one of the sides of a deformable triangle having an imaginary base, this imaginary base being delimited by the articulation point of the section of the lower intermediate rail to the section of the upper intermediate rail and by the articulation point of the lower section of the main rail to the upper section of the main rail. The articulation point of the two lower sections 202 and 204 being designated e, the articulation point of the section 202 to the section 201 being designated f and the articulation point of the section of intermediate rail 204 to the section 203 being designated g, the folding of the guard rail 121 will now be explained.

When the staircase section 63 is folded beneath the staircase section 62 a traction force is exerted on the articulation point e through the intermediary of the upright 207, which provokes the simultaneous deformation of the triangle e f g and of the deformable parallelogram formed by the upper sections 201, 203 and 205 and 206 of the main rails, of the intermediate rail, and of the uprights, respectively.

At the time of this deformation the sections 201 and 203 approach the upper staircase section 62 according to a translatory circular movement. At the time of this movement, the point g, by rotation about the upright 206, approaches the point f and the imaginary base g f of the deformable triangle e f g decreases in length. This decrease in length, in combination with the rotary movement of the point f with respect to the upper staircase section 62 forces the apex e of the deformable triangle e f g to be displaced downward so as, as follows, at the end of folding, to have just been displaced beneath the upper staircase section laterally to the lower staircase section. It is well to note that at the end of folding the uprights 205 and 206 come to be be disposed parallel to the upper staircase section and that the articulation point f comes to be disposed forward of the articulation axis between sections.

So that the apex e of the triangle may come to be disposed beneath the upper staircase section laterally to the lower staircase section, it is necessary that the length of the side e f decreases from the distance between f and the articulation point of the section 201 to the upright 207 either equal or very slightly greater than the length of the side eg decreases from the distance between g and the articulation point of the section 203 to the upright 206.

Moreover, it is necessary that the point e, that the articulation point of the upright 207 to the lower section 63 and that the articulation point of the lower staircase section 63 to the upper section 62 never be aligned, so as to avoid any jamming.

It is well to note that, thanks to this configuration, the guard rail is deformed only when the staircase sections are folded or are deployed.

Advantageously, when the staircase structure is entirely deployed, the said guard rails are connected to the frame of the access door in the vehicle by telescopic elements (not shown).

At the time of the deployment, as soon as the contactor 95 is actuated by the cam 95A, the motor 76 is stopped and is braked, the staircase being in contact with the ground by at least one roller 122 mounted freely rotatably on the lower extremity of the lower section 63. The actuation of the contactor 96 similarly actuates the circuitry of the illumination of the staircase, which is afterwards controlled manually.

The final maneuver effected in the deployment phase is the placing on the frame of the access door the telescopic elements for the guard rails 121.

Advantageously, when the structure is deployed, the carriage 4 on which the said structure is mounted is prevented from sliding in the direction of its insertion, by locking means.

These locking means are constituted according to a preferred form, by a stop 123 carried by the staircase structure 5 and by a friction roller 124 mounted in the compartment 1 of the vehicle opposite which is placed the stop 23 in deployed position. Preferably, the stop 123 is mounted on the shaft 68 of the structure 5, bracing the beams 64 of the upper section 62. This stop 123 is advantageously placed in the median axis of the said structure. The friction roller 124 is preferably mounted on the forward extremity of the central slide 21. At the time of tilting of the structure, the stop 123 comes to be placed forward of the friction roller 124. Preferably, play is maintained between the stop and the friction roller so as to permit a certain flexibility in the axial direction of the staircase with respect to the compartment.

In the case where the carriage 4, because of poor adjustment, will not advance far enough in the compartment at the time of deployment, the stop 123 comes to bear on the friction roller 124 and pushes the carriage 4 forwardly towards its correct position.

The folding phase of the staircase is controlled by the return of the telescopic elements of the guard rails 121. To this effect, a contactor is mounted in each telescopic element and is actuated at the time of the returning to position of the guard rails from the said telescopic elements. At this instant, the motor 76 is actuated, which provokes the folding of the staircase structure 5 and therefore consequently, the removal of the stop 123 from locking the return of the carriage 4.

When the contactor 95 is actuated by the cam 95A, the motor 76 is stopped and is braked. At this instant, the staircase structure is out of the vehicle and in the extension of the compartment 1 and is therefore ready to be returned into the said compartment.

Nevertheless, so as to diminish the forces exerted by the weight of the lower staircase 63 on its articulation to the upper staircase 62 and so as to avoid their separation, it is necessary to maintain the said lower staircase against the said upper staircase during the return movement of the structure 5 into the compartment 1.

Figure 27:
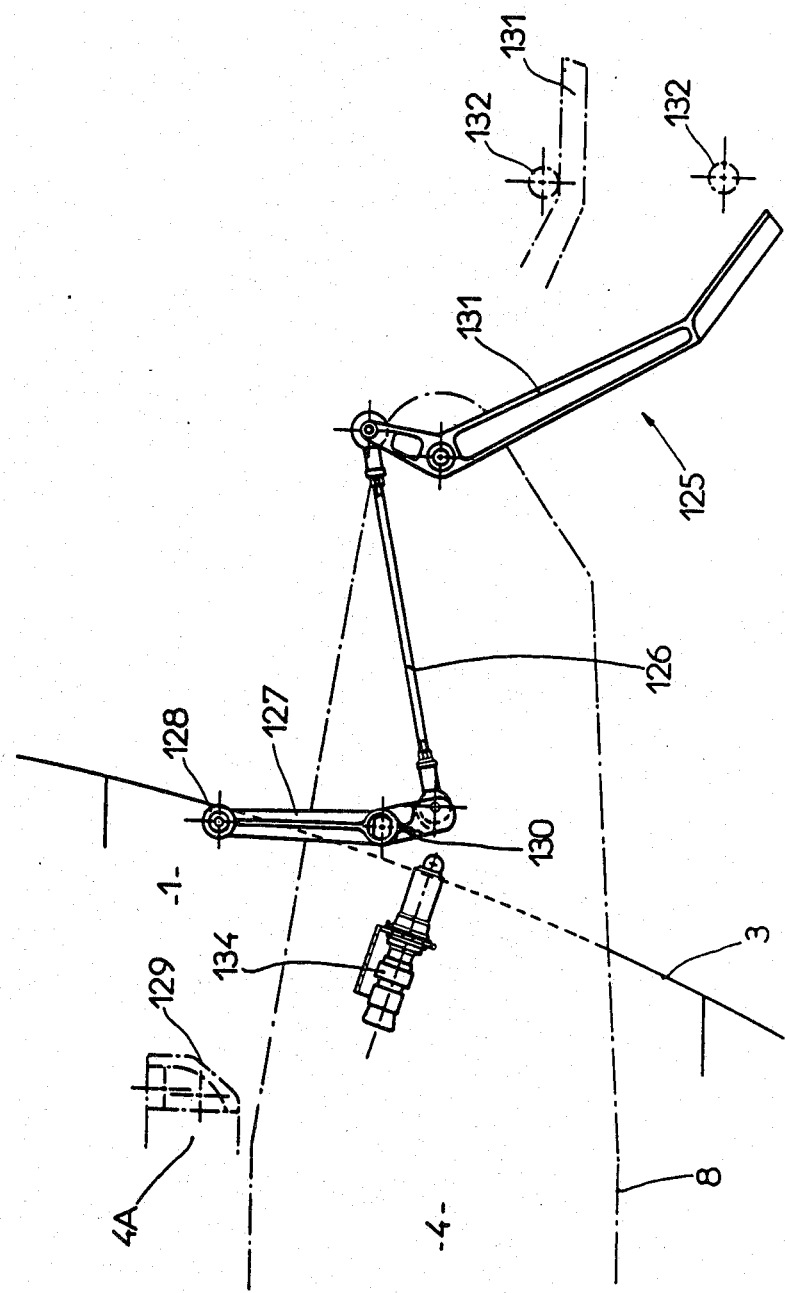
FIG. 27 is a view of the cradle for locking the lower section beneath the upper section.

To this end, as illustrated in FIG. 27, there is provided a cradle 125 articulated to the carriage 4 on an axis transverse to the direction of displacement of this latter, coming, by pivoting upward, to support the free extremity of the lower section 63 and to lock the two sections 62 and 63 the one to the other.

Preferably, the pivoting movement of the cradle 125 upward is generated by the re-entry movement of the carriage into the compartment.

To this end, the cradle 125 is extended beyond its axis by a claps, so as articulately to receive the extremity of a rod 126 the other extremity of which is articulated at its lower extremity to a pivoting lever 127 articulated to the carriage 4. The rod and lever system is situated behind the cradle 125. The upper extremity of the lever 127 is terminated by a friction roller 128 which, during the re-entry movement of the staircase, cooperates from the very first with an inclined ramp 129 disposed in the upper portion of the entrance of the compartment 1.

Preferably, this ramp 129 is mounted on the forward extremity of the side rails 4A.

This ramp 129 has the effect of forcing the lever 127 to pivot about its articulation axis, which provokes the pivoting movement of the cradle 125 upward, which consequently may come to support the free extremity of the lower section 63.

Later, the friction roller 128 of the lever 127 cooperates with the bottom of the lateral rail 4A of the compartment 1. This rail serves to maintain the lever 127 inclined, which permits assuring the angular locking of the two sections 62 and 63 when they are in the compartment.

Advantageously the length of the rod 126 is adjustable so as to be able to adjust the pressure of the cradle 125 on the extremity of the lower section 63.

It will be understood that the unlocking of the folded position of the sections 62 and 63 may intervene only when the folded staircase is extracted from the compartment 1 and when the lever 127 is no longer maintained by the ramp 126.

So as to facilitate this unlocking there is provided an elastic spring mechanism which has the function of assuring the downward pivoting of the cradle 125 and thus sufficiently to separate this latter from the free extremity of the lower section 63 so as not to be opposed to its deployment.

Preferably, this elastic mechanism is a torsion spring 130 mounted on the articulation axis of the lever 127 to the carriage 4 and cooperating with these latter. According to a preferred embodiment, the cradle 125 is articulated to the carriage 4 on the flanks 8 of this latter and along the articulation axis of the upper section 62 on the said carriage 4.

Still according to a preferred embodiment, the cradle 125 is constituted by a pair of lateral arms 131 of the carriage 4. Each one of these arms 131 cooperating with one and only one lever 127.

The arms 132 being articulated to the exterior of the carriage 4 these latter draw closer the one toward the other.

Preferably, the free extremity of each one of these arms 131 cooperates in support with a friction roller 132 lateral to the lower section 63 and coaxial with support rollers 122 that comprise this section.

In order to assure that the staircase is folded before it enters into the compartment 1, the said staircase is provided with an apparatus for verification of the folding of the sections the one against the other, capable of blocking the entry of the staircase into the compartment in case of an anomaly.

This verification apparatus comprises a contactor 133 mounted on the upper section 62 and capable of detecting the presence of the lower section 63 against the upper section, and by another contactor 134 detecting the actuation of the contactor 133 after locking by the cradle 125 and controlling the stoppage of the insertion of the staircase into the compartment 1 in the case where the contactor 133 is not actuated.

The contactor 134 is mounted on the carriage 4 and is actuated by the lever 127 when this latter is inclined during the entry of the staircase into the compartment (FIG. 27). If the contactor 133 is not actuated in spite of the movement of the cradle 125, the contactor 134 gives the order to the motor mechanism 6 for driving the carriage to be stopped.

In the case where the contactor 133 is actuated, the entry of the staircase proceeds normally.

Preferably, a contactor 133 is mounted on each beam 64 of the upper section and a contactor 134 is present behind each lever 127 for actuation of the cradle 125.

The entry of the staircase into the compartment was controlled at the time of the actuation of the contactor 95 which has simultaneously stopped the motor 76 and which gives the order to the motor 18 to function.

The axis of the staircase is placed parallel to the axis of the compartment by the device for restoring the staircase in position at the time of its ascended entry to the back of the carriage.

The carriage 4 is then locked in re-entry position. The detection of the locking of the carriage in re-entry position by the contactor 45A advantageously causes the closing of the hatch of the compartment 1.

Figure 29:
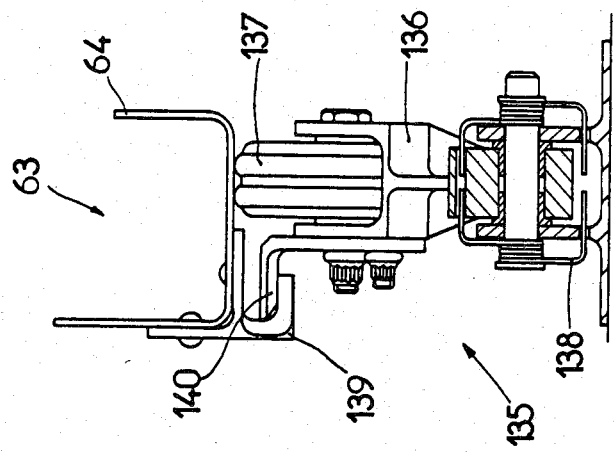
FIG. 29 is a sectional view along the line E—E of FIG. 28.
Figure 28:
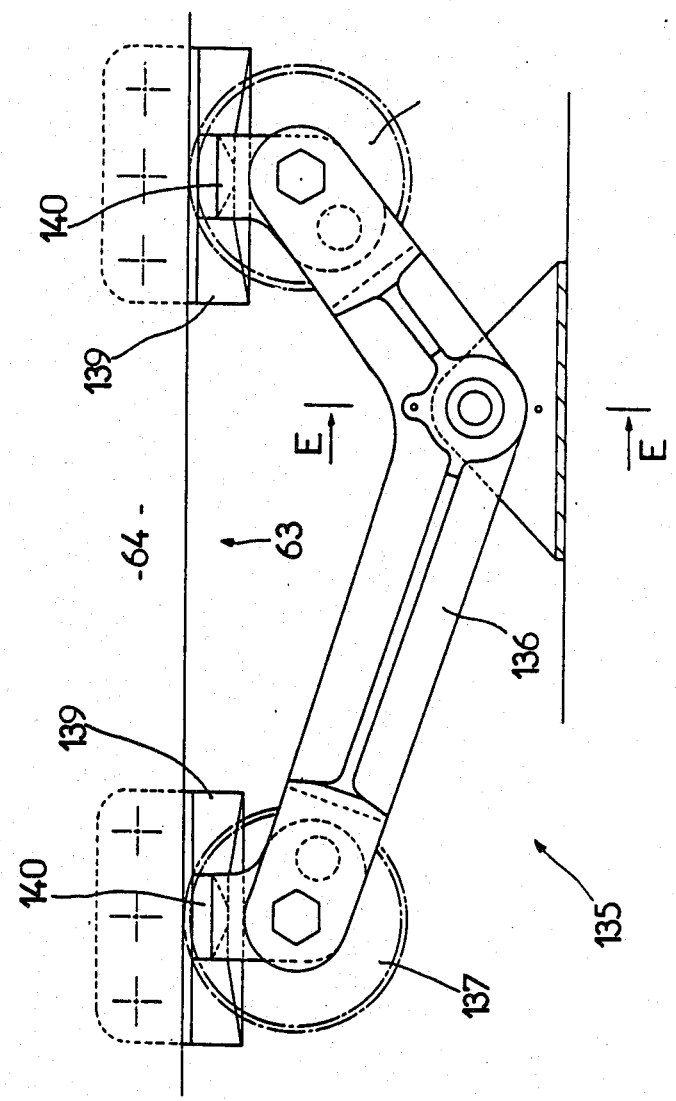
FIG. 28 is a side view of the compensator according to the invention.

According to another characteristic according to the invention so as to unburden the carriage from the overhanging relationship of the staircase structure and so as to block this latter laterally, in the compartment and in the lower portion of this latter is mounted at least one compensator 135 cooperating with the blocking mechanisms mounted on the extremity of the structure when this latter is folded. As is shown in FIGS. 28 and 29, the compensator 135 is constituted from a fork 136 having two branches, each one carrying at its extremity a roller 137, the said fork being articulated in a clasp on the lower portion of the compartment 1.

Advantageously, a spring 138 maintains the rollers 137 on a same level parallel to the rails 4A of the carriage 4.

On the rollers 137 there comes to roll the beam 64 of the lower section 62.

On this lower section 62 are fixed the mechanisms for blocking the extremity of the structure 5.

These blocking mechanisms are constituted by hooks 139 fixed to the beam 64 in which come to be placed tongues 140 fixed to the branches of the fork 136 at the level of the rollers 137.

The hooks 139 and the tongues 140 have a shape permitting supporting, with the rollers 137 bearing against the beam 64, a great portion of the weight of the staircase.

Moreover, the tongues 140 come in contact with the base of the hooks 137 so as laterally to block the forward extremity of the staircase. Preferably, two compensators are mounted in the compartment 1.

Thus, the staircase is well maintained and blocked in the interior of the compartment and the carriage 4 is largely relieved from the forces of the cantilever mounting of the said staircase. The motor elements of the staircase are preferably supplied with electrical energy and comprise an easily accessible manual control.

The foldable staircase for vehicles according to the invention permits obtaining on the said staircase a great safety for the users, protecting the said staircase while providing it with a certain flexibility in its connections with the vehicle and increasing the speed of the manipulations effected on the staircase.

It will be evident that the present invention may receive any installations and any variations in the domain of equivalent techniques without departing whatsoever from the scope of the present patent.

I claim:

1. Foldable staircase for vehicles comprising a carriage (4) slidably mounted on rails (4A) in a compartment (1), a foldable staircase structure (5) mounted in an overhanging manner on the carriage (4), a motor mechanism (6) for actuating the said carriage in the compartment and motor means (7) for folding and unfolding along a vertical plane the structure (5) when this latter is outside the compartment, characterized in that the motor mechanism (6) is constituted by a rack and pinion assembly (14) and by an apparatus (15) for adjusting the play of the rack and pinion assembly and for guiding the carriage (4).

2. Staircase according to claim 1 characterized in that the apparatus (15) for adjusting the play of the rack and pinion assembly (14) is constituted by a set of friction rollers (20) fixed to the carriage (4) and by a slide (21) fixed parallel to the rack (16) and on the upper portion of the compartment (1) which slide is adapted to receive the set of friction rollers (20).

3. Staircase according to claim 2 characterized in that the set of friction rollers (20) comprises three friction rollers the central friction roller (20A) of which is mounted on an adjustable eccentric (23) so as to adjust the play in the rack and pinion assembly (14).

4. Staircase according to claim 2 characterized in that at least one of the friction rollers (20B) is mounted on an adjustable eccentric (24) so as to adjust the operating play of the friction rollers in the slide (21).

5. Staircase according to claim 1 characterized in that it is provided with means permitting the variation of the angular position of the longitudinal axis of the said staircase with respect to the longitudinal axis of the compartment (1) and about a vertical axis of rotation and means for guiding the carriage (4) with respect to the lateral rails (5) mounted to the rear of the said carriage.

6. Staircase according to claim 5 characterized in that the means permitting the angular variation of the longitudinal axis of the staircase are constituted by the articulated assembly of the carriage (4) with respect to a vertical axis of the apparatus for adjusting the play of the rack and pinion assembly and for lateral guiding of the carriage (4).

7. Staircase according to claim 5 characterized in that the means for guiding with respect to the lateral rails (4A) mounted to the rear of the carriage (4) and on each side of this latter are each constituted by two friction rollers (27) designed to roll against the vertical face of a rail (4A) and by a body (28) supporting the said friction rollers and being articulated along a vertical axis on the carriage (4).

8. Staircase according to claim 5 characterized in that it comprises means permitting a relative lateral tilting between the longitudinal axis of the vehicle and means for restoring the said axis of the compartment (1) at the time of the re-entry of the said staircase into the said compartment.

9. Staircase according to claim 8 characterized in that the means for lateral tilting and restoration in position of the staircase into the compartment (1) are constituted by a slot (29) provided in the vertical face of the rail (4A) opposite which is found, when the carriage (4) is at the end of its course, the forward friction roller (27) of the rear lateral guiding apparatus of the said carriage and by the articulated assembly of the support body (22) for the set of friction rollers (20) on the carriage (4).

10. Staircase according to claim 8 characterized in that the means permitting the relative tilting of the axis of the staircase with respect to the vehicle are each provided with a device determining a threshold force beyond which the tilting is permitted.

11. Staircase according to claim 10 characterized in that the device determining the threshold force is constituted by a cam (35) fixed to the body (28) carrying the friction rollers (27), by a wheel (36) articulated on the carriage (4) and rolling against the cam (35) and by an adjustable compression spring (37) fixed to the said carriage maintaining the wheel (36) applied against the cam (35).

12. Staircase according to claim 1 characterized in that it is provided with at least one slidable immobilization means for the carriage (4) in the compartment (1) in re-entry position.

13. Staircase according to claim 12 characterized in that the immobilization means is constituted by a pin (39) fixed to the rear extremity of the central slide (21) and by a locking device (40) fixed to the carriage and designed to come into cooperation with the pin (39).

14. Staircase according to claim 13 characterized in that the locking device (40) is constituted by an articulated bolt (42) adapted to receive the pin (39), by an articulated lever (43) controlling the bolt (42), by a driving mechanism (44) for the lever (43) and by at least one contactor (45) detecting the locked state of the device (40).

15. Staircase according to claim 14 characterized in that on the articulation of the bolt (42) is mounted a clasp (50) in which is placed the extremity of the bolt provided with a hook (47) in unlocked position under the effect of a spring (51), in that the hook (47) in unlocked position under the effect of a spring (51) receives in locked position a friction roller (48) carried by the articulated lever (43) and in that the clasp (50) in unlocked position comes to cover the hook (47) so that the friction roller (48) does not come to be housed therein.

16. Staircase according to claim 15 characterized in that the driving mechanism (44) for the lever (43) is constituted by an electromagnet which is energized at the time of the control for unlocking which causes the retreat of the friction roller (48) from the hook (47) of the bolt (42) and the closing of the hook by the clasp (50) and which is released when the carriage (4) has attained a certain position in the compartment (1).

17. Staircase according to claim 14 characterized in that the immobilization device comprises a contactor (45A) carried by the locking device (40) and actuated by the control lever (43) for the bolt (42) which on the one hand gives the command to the motor mechanism (6) to function to detect the unlocking and on the other hand causes the closing of the hatch of the compartment (1) on detecting the locking and comprises a contactor (45B) carried by the carriage (4) and actuated by a cam (56) fixed to the compartment (1) which gives the order to release the electromagnet when it is actuated.

18. Staircase according to claim 1, the foldable structure of which staircase is articulated between the flanks (8) of the carriage (4) and comprises motor means (7) for folding and unfolding the said structure characterized in that the motor means (7) are constituted by a motor (76) carried by the staircase structure (5), by at least one circular chuck (77) fixed to an output shaft (78) of the motor and by at least one connecting rod (79) articulated between a chuck (77) and a lateral flank (8) of the carriage (4) and parallel to the beam (64).

19. Staircase according to claim 18 characterized in that the foot (79B) of the connecting rod (79) is provided with an oblong opening (92) extended in the axis of the said connecting rod, which oblong opening (92) receives a stud (91) fixed to a flank (8) of the carriage (4).

20. Staircase according to claim 18, the structure (5) of which is constituted by an upper section (62) and a lower section (63) articulated the one to the other, and the motor means (7) of which comprise at least one device for transmitting the movement to the lower section (63) with respect to its articulation to the upper section (62), characterized in that these devices are each constituted by at least two cables (97) and (98) at least one of which permits the deployment of the structure (5) and the other or others its folding, by a pulley (99) mounted coaxially to the articulation of the sections (62) and (63) and on which are fixed the extremities of the cables (97) and (98), by the chuck (77) to the periphery of which is fixed the other extremity of the said cables and by sliding sleeves (100) for the cables disposed between the pulley (99) and the chuck (77).

21. Staircase according to claim 20 characterized in that the sliding sleeves (100) for the cables (97) and (98) are constituted by a plurality of friction rollers (103) the axes of rotation of which are disposed on an arc of a circle having a large radius of curvature.

22. Staircase according to claim 18 characterized in that between the sections (62) and (63) the said escalator is provided with at least one driving and locking system for the lower section (63) with respect to the upper section (62).

23. Staircase according to claim 22 characterized in that the driving and locking system for the lower section (63) with respect to the upper section (62) is constituted by a driver (111) fixed to the pulley (99), by a screw (112) articulated on the lower section cooperating with the driver (111), by an actuating mechanism and a mechanism for locking the screw (112) fixed to the upper section (62), by an elastic mechanism for maintaining in cooperation the screw with the driver (111) and by a slidable assembly for the pulley (99) on the articulation between the sections (62) and (63).

24. Staircase according to claim 23 characterized in that the upper surface of the driver (111), with which the screw cooperates, comprises a slot (111A) receiving a friction roller (113) mounted on the foot (114) of the bolt (112) and is rounded according to a radius of curvature the center of which is the axis of rotation of the pulley (99).

25. Staircase according to claim 23 characterized in that the mechanism for actuating and locking of the bolt (112) is constituted by a ramp (117) mounted on the upper section (62) having a profile of the arc of a circle having an axis parallel to the axis of articulation of the bolt (112) and on which comes to roll a friction roller (118) carried by the head of the bolt and by a rod (119) parallel to the said articulation axis of the bolt (112) mounted opposite the ramp (117) on the upper section (62) and against which comes to bear the catch (112B) of the bolt (112).

26. Staircase according to claim 23 characterized in that the pulley (99) is mounted freely rotatably on journal bearings (120) delimited on the articulation between the sections (62) and (63).

27. Staircase according to claim 1 comprising a foldable staircase structure (5) constituted particularly by two guard rails (122) each comprising a main rail in two sections (201) and (202), an intermediate rail in two sections (203) and (204), two upper uprights (205) and (206) articulated to the upper section (62) of the staircase and a lower upright (207) articulated to the lower section (63) of the staircase, the staircase characterized in that the lower section of intermediate rail is shorter than the lower section of main rail, in that the lower extremities of these two sections are articulated the one to the other and to an upper extremity of the upright (207), in that the upper extremity of the section of main rail (202) and the lower extremity of the section of main rail (201) are articulated the one to the other and to the upper extremity of the upper upright situated closest to the articulation axis between sections, that is to say the upright (206) and in that the lower section of the intermediate rail is articulated to the upper section of intermediate rail at a point situated between the point of articulation to the upright (207) in such a fashion that the sections (202) and (204) constitute the sides of a deformable triangle having an imaginary base the apex of which, articulated to the upright (207), comes at the time of folding to be disposed beneath the upper section (62) of the staircase.

28. Staircase according to claim 27 characterized in that the articulation points of the uprights (205) and (206) to the upper section (62) of the staircase are spread apart from the lower extremity of the upper section and therefore from the articulation axis between sections.

29. Staircase according to claim 27 characterized in that the upper section (203) of the intermediate rail, the staircase section (62) define with the uprights (205) and (206) a deformable parallelogram which, at the time of folding of the structure (5) is deformed toward the articulation axis between sections.

30. Staircase according to claim 27 of the staircase comprising guard rails (122) provided with telescoping elements being connected to the frame of the access door characterized in that a contactor is mounted in each telescoping element and is actuated at the time of folding of the telescoping elements so as to give the order to commence the folding phase of the structure (5).

31. Staircase according to claim 1 characterized in that it comprises a cradle (125) articulated to the carriage (4) parallel to the articulation of the structure (5) which comes to bear, through pivoting upward, on the free extremity of the lower section (63) and to lock the two sections (62) and (63) the one to the other.

32. Staircase according to claim 31 characterized in that the movement of the cradle (125) is obtained at the time of the re-entry of the carriage (4) into the compartment (1) for the unlocking and at the time of the exit of this latter at the time of the unlocking.

33. Staircase according to claim 31 characterized in that it is provided with an apparatus for verifying the folding of the sections (62) and (63) the one against the other before the insertion of the said staircase into the compartment.

34. Staircase according to claim 33 characterized in that the device for verifying the folding of the sections (62) and (63) is constituted by a contactor (133) mounted on the upper section (62) and capable of detecting the presence of the lower section (63) against the upper section (62) and by another contactor (134) detecting the actuation of the contactor (133) after pivoting of the cradle (125) and controlling the stoppage of the insertion of the staircase into the compartment (1) in the case where the contactor (133) was not actuated.

35. Staircase according to claim 1 characterized in that the compartment (1) is mounted at least one compensator (135) cooperating with the blocking mechanisms mounted on the forward extremity of the structure (5) when this latter is folded so as to relieve the carriage (4) from the cantilever relationship with structure (5) and so as to block this latter laterally.

* * * * *